US012801602B2

(12) United States Patent
Ahmandi et al.

(10) Patent No.: US 12,801,602 B2
(45) Date of Patent: *Nov. 17, 2026

(54) INEXACT TIMESTAMP RANGE MATCHING JOIN FOR TIME SERIES DATA (AS OF JOIN)

(71) Applicant: Snowflake Inc., Bozeman, MT (US)

(72) Inventors: Hossein Ahmandi, Seattle, WA (US); Jayanta Das, Bellevue, WA (US); Joshua Klahr, San Carlos, CA (US); Boyung Lee, Kirkland, WA (US); Wenye Li, Bellevue, WA (US); Abdul Q. Munir, Bozeman, MT (US); Yi Pan, San Jose, CA (US)

(73) Assignee: Snowflake Inc., Bozeman, MT (US)

( * ) Notice: Subject to any disclaimer, the term of this patent is extended or adjusted under 35 U.S.C. 154(b) by 24 days.

This patent is subject to a terminal disclaimer.

(21) Appl. No.: 18/392,385

(22) Filed: Dec. 21, 2023

(65) Prior Publication Data

US 2025/0068628 A1 Feb. 27, 2025

Related U.S. Application Data

(63) Continuation of application No. 18/453,079, filed on Aug. 21, 2023, now Pat. No. 11,921,716.

(51) Int. Cl.

| | |
|---|---|
| ***G06F 16/20*** | (2019.01) |
| ***G06F 16/2453*** | (2019.01) |
| ***G06F 16/2455*** | (2019.01) |
| ***G06F 16/27*** | (2019.01) |

(52) U.S. Cl.

CPC .... *G06F 16/24537* (2019.01); *G06F 16/2456* (2019.01); *G06F 16/278* (2019.01); *G06F 16/24544* (2019.01)

(58) Field of Classification Search

CPC ......... G06F 16/24537; G06F 16/24544; G06F 16/2456; G06F 16/278

See application file for complete search history.

(56) References Cited

U.S. PATENT DOCUMENTS

| | | | |
|---|---|---|---|
| 9,679,006 B2 | 6/2017 | Wright et al. | |
| 10,031,943 B1 | 7/2018 | Raghavendra et al. | |
| 11,921,716 B1 | 3/2024 | Ahmandi et al. | |
| 2007/0226203 A1* | 9/2007 | Adya | G06F 16/2445 |

(Continued)

OTHER PUBLICATIONS

"U.S. Appl. No. 18/453,079, Notice of Allowance mailed Jan. 24, 2024", 8 pgs.

(Continued)

*Primary Examiner* — Diedra McQuitery

(74) *Attorney, Agent, or Firm* — Schwegman Lundberg & Woessner, P.A.

(57) ABSTRACT

A method includes generating, by at least one hardware processor, a query plan of a query. The query includes a JOIN operation between first time series data and second time series data. At least one node in the query plan corresponding to the JOIN operation is modified to generate a modified query plan. The modifying is based on replacing the at least one node with a new node including a UNION operation. The UNION operation is based on the first time series data and the second time series data. Execution of the query is scheduled based on the modified query plan.

30 Claims, 29 Drawing Sheets

(56) References Cited

U.S. PATENT DOCUMENTS

| | | | |
|---|---|---|---|
| 2016/0328442 | A1 | 11/2016 | Waas et al. |
| 2016/0335334 | A1 | 11/2016 | Teodorescu et al. |
| 2017/0344549 | A1 | 11/2017 | Humad |
| 2021/0374140 | A1* | 12/2021 | Adams .............. G06F 16/24537 |
| 2023/0112250 | A1 | 4/2023 | Agrawal et al. |

OTHER PUBLICATIONS

Databrickslabs, "AS OF Join", [Online]. Retrieved from the Internet: https: databrickslabs.github.io tempo user-guide.html#as-of-join, (Accessed online Dec. 29, 2023), 9 pages.

IABDB, "Mechanics of the As-Of-Join Primitive", [Online]. Retrieved from the Internet: https: iabdb.me 2017 08 23 mechanics-of-the-as-of-join-primitive , (Aug. 23, 2017), 8 pages.

Influxdata Inc, "As-of operations and irregular spacing of data using Flux", [Online]. Retrieved from the Internet: https: community. influxdata.com t as-of-operations-and-irregular-spacing-of-data-using-flux 14612, (Accessed online Dec. 29, 2023), 4 pages.

Kinetica, "notion of an inexact match join via the ASOF join function", [Online]. Retrieved from the Internet: https: docs.kinetica. com 7.1 sql query ?search-highlight=ASOF#sql-join-asof, (Accessed online Dec. 29, 2023), 99 pages.

KX Systems Inc, "Kdb plus and q documentation asof", [Online]. Retrieved from the Internet: https: code.kx.com q ref asof , 2 pages.

Kx Systems Inc, "Kdb plus and q documentation aj, aj0, ajf, ajf0", [Online]. Retrieved from the Internet: https: code. kx.com q ref aj , (Accessed online Dec. 29, 2023), 4 pages.

Quasar, "Timeseries what are ASOF joins", [Online]. Retrieved from the Internet: https: blog. quasar.ai timeseries-what-are-asof-joins, (Jan. 30, 2023), 8 pages.

Quasar, "Quasar ai master queries select joins", [Online]. Retrieved from the Internet: https: doc.quasar.ai master queries select.html#asof-joins, (Accessed online Dec. 29, 2023), 24 pages.

Questdb, "JOIN keyword", [Online]. Retrieved from the Internet: https: questdb.io docs reference sql join #asof-join, (Accessed online Dec. 29, 2023), 14 pages.

Stack Overflow, "Snowflake As of Join query", [Online]. Retrieved from the Internet: https: stackoverflow.com questions 71152992 snowflake-as-of-join-query, (Accessed online Dec. 29, 2023), 7 pages.

Stack Overflow, "SQL JOIN and different types of JOINs", [Online]. Retrieved from the Internet: https: stackoverflow.com questions 17946221 sql-join-and-different-types-of-joins, (Accessed online Dec. 29, 2023), 18 pages.

The Postgresql Global Developmen, "RFC ASOF Join", [Online]. Retrieved from the Internet: https: www.postgresql.org message-id flat CALzhyqwuVz0FJZ-oCYQ9d%2ByrPrbF5a9HDyAjxuSUdgq8n7nshQ%40mail.gmail.com, (Accessed online Dec. 29, 2023), 11 pages.

Timescale Timescaledb Public, "Add support for JOINing time series via "AS OF" time #271", [Online]. Retrieved from the Internet: https: github.com timescale timescaledb issues 271, (Accessed online Dec. 29, 2023), 9 pages.

Two Sigma, "Introducing Flint: A Time-Series Library for Apache Spark", [Online]. Retrieved from the Internet: https: www.twosigma. com articles introducing-flint-a-time-series-library-for-apache-spark , (Accessed online Dec. 29, 2023), 9 pages.

Vertica, "SQL Reference Manual SQL Language Elements Predicates Interpolate", [Online]. Retrieved from the Internet: https: www.vertica.com docs 9.2.x HTML Content Authoring SQLReferenceManual LanguageElements Predicates INTERPOLATE. htm, (Accessed online Dec. 29, 2023), 5 pages.

"U.S. Appl. No. 18/453,079, Notice of Allowance mailed Oct. 12, 2023", 10 pgs.

U.S. Appl. No. 18/453,079 U.S. Pat. No. 11,921,716, filed Aug. 21, 2023, Inexact Timestamp Range Matching Join for Time Series Data (AS OF JOIN).

* cited by examiner

602

AsOf Join Output

| L.DIM1 | L.TIMESTAMP | R.DIM1 | R.TIMESTAMP | R.PAYLOAD |
|---|---|---|---|---|
| 1 | 00:01:08 | null | null | null |
| 2 | 00:01:20 | null | null | null |
| 3 | 00:01:10 | 3 | 00:01:10 | d |
| 3 | 00:01:15 | 3 | 00:01:10 | d |
| 3 | 00:01:15 | 3 | 00:01:10 | d |

FIG. 6

802

AS OF JOIN (EVENT – ACTION) RESULT

| USER_ID | CREATE_TS | PAYLOAD |
|---|---|---|
| 1 | 00:01:08 | A |
| 2 | 00:01:10 | B |
| 2 | 00:01:15 | C |
| 3 | 00:01:20 | D |

| USER_ID | CREATE_TS | PAYLOAD |
|---|---|---|
| null | null | null |
| 2 | 00:01:09 | b |
| 2 | 00:01:11 | c |
| 3 | 00:01:20 | e |

804

| USER_ID | CREATE_TS | PAYLOAD | CREATE_TS | PAYLOAD |
|---|---|---|---|---|
| 1 | 00:01:08 | A | null | null |
| 2 | 00:01:10 | B | 00:01:09 | b |
| 2 | 00:01:15 | C | 00:01:11 | c |
| 3 | 00:01:20 | D | 00:01:20 | e |

*FIG. 8*

910

EVENT

| USER_ID | CREATE_TS | PAYLOAD |
|---|---|---|
| 1 | 00:01:08 | A |
| 2 | 00:01:10 | B |
| 2 | 00:01:15 | C |
| 3 | 00:01:20 | D |

912

ACTION

| USER_ID | CREATE_TS | PAYLOAD |
|---|---|---|
| 2 | 00:01:05 | a |
| 2 | 00:01:09 | b |
| 2 | 00:01:11 | c |
| 2 | 00:01:20 | d |
| 3 | 00:01:20 | e |
| 4 | 00:01:25 | f |

Union user_id, create_ts
Null padding on other columns from each sides
Generate is_left column

1102

| USER_ID | CREATE_TS | EVENT.PAYLOAD | ACTION.CREATE_TS | ACTION.PAYLOAD | IS_LEFT |
|---|---|---|---|---|---|
| 1 | 00:01:08 | A | null | null | 1 |
| 2 | 00:01:10 | B | null | null | 1 |
| 2 | 00:01:15 | C | null | null | 1 |
| 3 | 00:01:20 | D | null | null | 1 |
| 2 | 00:01:05 | null | 00:01:05 | a | 0 |
| 2 | 00:01:09 | null | 00:01:09 | b | 0 |
| 2 | 00:01:11 | null | 00:01:11 | c | 0 |
| 2 | 00:01:20 | null | 00:01:20 | d | 0 |
| 3 | 00:01:20 | null | 00:01:20 | e | 0 |
| 4 | 00:01:25 | null | 00:01:25 | f | 0 |

TO FIG. 12

FIG. 11

FROM FIG. 11

1202

Partition By: user_id,
Sort By: create_ts, is_left

| USER_ID | CREATE_TS | EVENT.PAYLOAD | ACTION.CREATE_TS | ACTION.PAYLOAD | IS_LEFT |
|---|---|---|---|---|---|
| 1 | 00:01:08 | A | null | null | 1 |
| 2 | 00:01:05 | null | 00:01:05 | a | 0 |
| 2 | 00:01:09 | null | 00:01:09 | b | 0 |
| 2 | 00:01:10 | B | null | null | 1 |
| 2 | 00:01:11 | null | 00:01:11 | c | 0 |
| 2 | 00:01:15 | C | null | null | 1 |
| 2 | 00:01:20 | null | 00:01:20 | d | 0 |
| 3 | 00:01:20 | null | 00:01:20 | e | 0 |
| 3 | 00:01:20 | D | null | null | 1 |
| 4 | 00:01:25 | null | 00:01:25 | f | 0 |

TO FIG. 13

*FIG. 12*

FROM FIG. 12

1302

Last_value on all action. * columns, partition by user_id, order by create_ts, rows between unbounded preceding and current row
Ignore rows that has null value on action.create_ts column

| USER_ID | CREATE_TS | EVENT.PAYLOAD | ACTION.CREATE_TS | LAST_VALUE(ACTION. CREATE_TS) IGNORE NULLS(ACTION. CREATE_TS) | ACTION.PAYLOAD | LAST_VALUE(ACTION. PAYLOAD) IGNORE NULLS(ACTION. CREATE.TS) | IS_LEFT |
|---|---|---|---|---|---|---|---|
| 1 | 00:01:08 | A | null | null | null | null | 1 |
| 2 | 00:01:05 | null | 00:01:05 | 00:01:05 | a | a | 0 |
| 2 | 00:01:09 | null | 00:01:09 | 00:01:09 | b | b | 0 |
| 2 | 00:01:10 | B | null | 00:01:09 | null | b | 1 |
| 2 | 00:01:11 | null | 00:01:11 | 00:01:11 | c | c | 0 |
| 2 | 00:01:15 | C | null | 00:01:11 | null | c | 1 |
| 2 | 00:01:20 | null | 00:01:20 | 00:01:20 | d | d | 0 |
| 3 | 00:01:20 | null | 00:01:20 | 00:01:20 | e | e | 0 |
| 3 | 00:01:20 | D | null | 00:01:20 | null | e | 1 |
| 4 | 00:01:25 | null | 00:01:25 | 00:01:25 | f | f | 0 |

TO FIG. 14

*FIG. 13*

FROM FIG. 13

1402

Filter: is_left = 1

| USER_ID | CREATE_TS | EVENT.PAYLOAD | ACTION.CREATE_TS | LAST_VALUE(ACTION. CREATE_TS) IGNORE NULLS(ACTION. CREATE_TS) | ACTION.PAYLOAD | LAST_VALUE(ACTION. PAYLOAD) IGNORE NULLS(ACTION. CREATE.TS) | IS_LEFT |
|---|---|---|---|---|---|---|---|
| 1 | 00:01:08 | A | null | null | null | null | 1 |
| 2 | 00:01:10 | B | null | 00:01:09 | null | b | 1 |
| 2 | 00:01:15 | C | null | 00:01:11 | null | c | 1 |
| 3 | 00:01:20 | D | null | 00:01:20 | null | e | 1 |

1404

Project: user_id, create_ts, event.payload, last_value(action.create_ts), last_value(action.payload)

| USER_ID | CREATE_TS | EVENT.PAYLOAD | LAST_VALUE(ACTION. CREATE_TS) IGNORE NULLS(ACTION. CREATE_TS) | LAST_VALUE(ACTION. PAYLOAD) IGNORE NULLS(ACTION. CREATE.TS) |
|---|---|---|---|---|
| 1 | 00:01:08 | A | null | null |
| 2 | 00:01:10 | B | 00:01:09 | b |
| 2 | 00:01:15 | C | 00:01:11 | c |
| 3 | 00:01:20 | D | 00:01:20 | e |

*FIG. 14*

INEXACT TIMESTAMP RANGE MATCHING JOIN FOR TIME SERIES DATA (AS OF JOIN)

PRIORITY CLAIM

This application is a Continuation of U.S. patent application Ser. No. 18/453,079, filed Aug. 21, 2023, the content of which is incorporated herein by reference.

TECHNICAL FIELD

Embodiments of the disclosure relate generally to databases and, more specifically, to configuration of AS OF JOIN operations including inexact timestamp range matching join for time series data in a structured query language (SQL) data warehouse of a database system.

BACKGROUND

Databases are widely used for data storage and access in computing applications. A goal of database storage is to provide enormous sums of information in an organized manner so that it can be accessed, managed, updated, and shared. In a database, data may be organized into rows, columns, and tables. Different database storage systems may be used for storing different types of content, such as bibliographic, full text, numeric, and/or image content. Further, in computing, different database systems may be classified according to the organizational approach of the database. There are many different types of databases, including relational databases, distributed databases, cloud databases, object-oriented databases, and others. For metrics data or financial data stored in such databases, there is often a need to associate rows from different tables using timestamps where the timestamp values are not the same. However, existing techniques to associate and process time series data can be resource-intensive, challenging, and time-consuming.

BRIEF DESCRIPTION OF THE DRAWINGS

The present disclosure will be understood more fully from the detailed description given below and from the accompanying drawings of various embodiments of the disclosure.

FIG. 6 illustrates an output table generated at the completion of the AS OF JOIN operation of FIG. 5, in accordance with some embodiments of the present disclosure.

FIG. 8 illustrates an output table generated at the completion of the AS OF JOIN operation of FIG. 7, in accordance with some embodiments of the present disclosure.

FIG. 9, FIG. 10, FIG. 11, FIG. 12, FIG. 13, and FIG. 14 illustrate physical optimization and modification of a query plan including the AS OF JOIN operation of FIG. 7 to generate the output table of FIG. 8, in accordance with some embodiments of the present disclosure.

DETAILED DESCRIPTION

Figure 1:
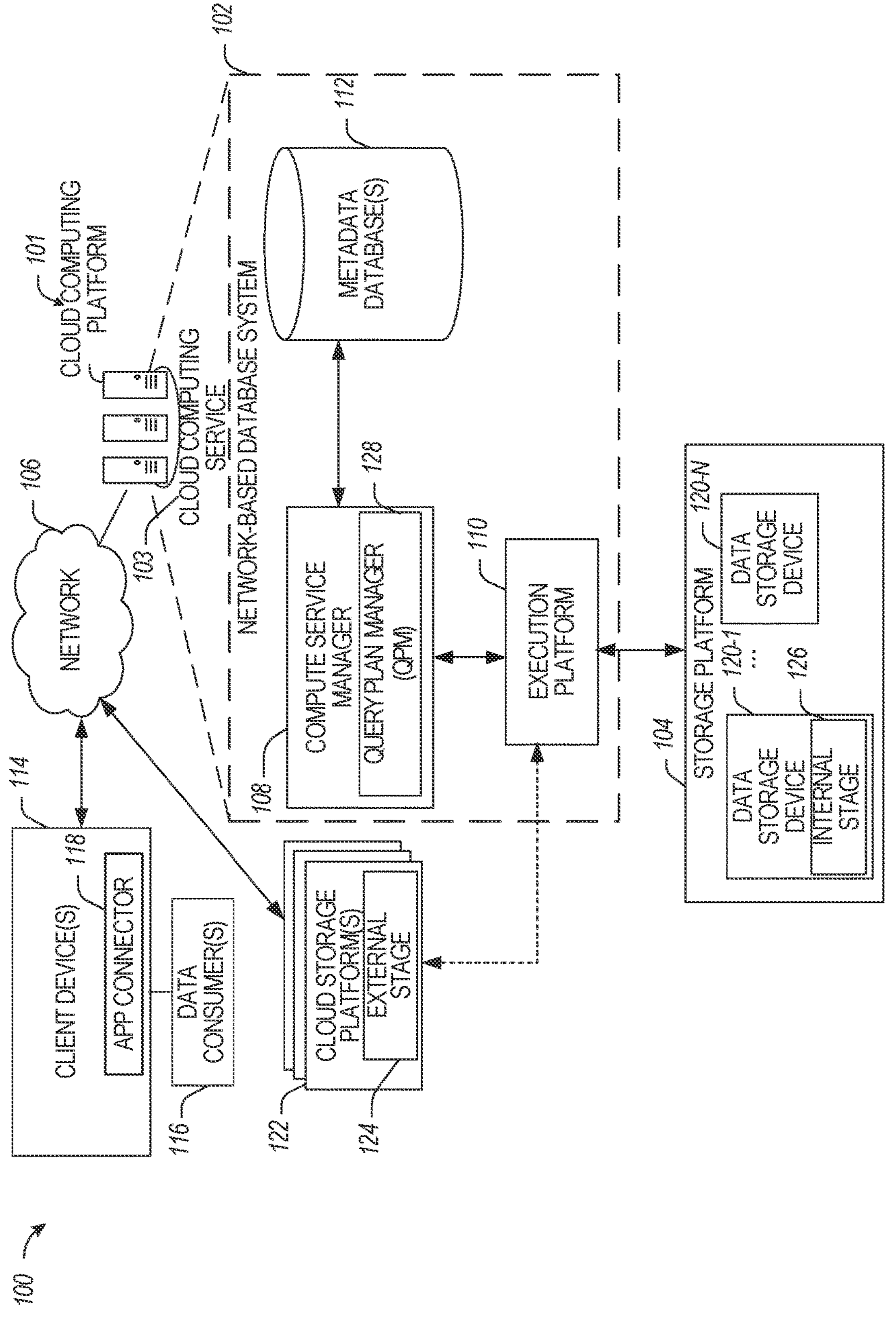
FIG. 1 illustrates an example computing environment that includes a network-based database system including a query plan manager (QPM) and an execution platform in communication with a cloud storage platform, in accordance with some embodiments of the present disclosure.

Reference will now be made in detail to specific example embodiments for carrying out the inventive subject matter. Examples of these specific embodiments are illustrated in the accompanying drawings, and specific details are outlined in the following description to provide a thorough understanding of the subject matter. It will be understood that these examples are not intended to limit the scope of the claims to the illustrated embodiments. On the contrary, they are intended to cover such alternatives, modifications, and equivalents as may be included within the scope of the disclosure.

In the present disclosure, physical units of data that are stored in a data platform—and that make up the content of, e.g., database tables in customer accounts—are referred to as micro-partitions. In different implementations, a data platform may store metadata in micro-partitions as well. The term "micro-partitions" is distinguished in this disclosure from the term "files," which, as used herein, refers to data units such as image files (e.g., Joint Photographic Experts Group (JPEG) files, Portable Network Graphics (PNG) files, etc.), video files (e.g., Moving Picture Experts Group (MPEG) files, MPEG-4 (MP4) files, Advanced Video Coding High Definition (AVCHD) files, etc.), Portable Document Format (PDF) files, documents that are formatted to be compatible with one or more word-processing applications, documents that are formatted to be compatible with one or more spreadsheet applications, and/or the like. If stored internal to the data platform, a given file is referred to herein as an "internal file" and may be stored in (or at, or on, etc.) what is referred to herein as an "internal storage location." If stored external to the data platform, a given file is referred to herein as an "external file" and is referred to as being stored in (or at, or on, etc.) what is referred to herein as an "external storage location." These terms are further discussed below.

Computer-readable files come in several varieties, including unstructured files, semi-structured files, and structured files. These terms may mean different things to different people. As used herein, examples of unstructured files include image files, video files, PDFs, audio files, and the like; examples of semi-structured files include JavaScript Object Notation (JSON) files, eXtensible Markup Language (XML) files, and the like; and examples of structured files include Variant Call Format (VCF) files, Keithley Data File (KDF) files, Hierarchical Data Format version 5 (HDF5) files, and the like. As known to those of skill in the relevant arts, VCF files are often used in the bioinformatics field for storing, e.g., gene-sequence variations, KDF files are often used in the semiconductor industry for storing, e.g., semiconductor-testing data, and HDF5 files are often used in industries such as the aeronautics industry, in that case for storing data such as aircraft-emissions data. Numerous other examples of unstructured-file types, semi-structured-file types, and structured-file types, as well as example use thereof, could certainly be listed here as well and will be familiar to those of skill in the relevant arts. Different people of skill in the relevant arts may classify types of files differently among these categories and may use one or more different categories instead of or in addition to one or more of these.

In different data processing cases (e.g., processing of metrics data or financial data), often there is a need to associate rows from different tables using timestamps where the timestamp values are not the same between the tables. This processing operation is referred to AS OF JOIN and can be used for processing time series data (e.g., data entered in different rows based on a corresponding timestamp).

The key capability provided by the AS OF JOIN operation is to enable analyzing a time series with respect to another time series, or a predefined time distribution. While application metrics (observability) can be used for preprocessing and aligning of time series data, historical analysis of such time series data can be difficult to achieve without using the AS OF JOIN semantics.

The disclosed techniques can be used to modify query plans that include an AS OF JOIN operation before query execution, as well as to perform optimization (e.g., logical optimization) of the query plan before the modification. In this regard, a query rewrite can be performed for a query that includes an AS OF JOIN operation to simplify the query processing operations, reduce data redundancy, and increase the query processing efficiency.

While there are options to express an AS OF JOIN operation using lateral joins or window functions, writing those queries requires structured query language (SQL) expertise not available to many analysts in the financial services domain or engineers in observability cases. Therefore, supporting a first-class primitive and the ability to process an AS OF JOIN operation is important for network-based database systems processing time series data. Furthermore, the more common and simpler approaches to performing an AS OF JOIN in SQL using CROSS JOIN or BAND JOIN operations lead to poor performance. In comparison, the disclosed AS OF JOIN query optimization and processing techniques provide improved performance with ease of use. Unlike time series-specific databases, the disclosed AS OF JOIN syntax and implementation allows performing this operation on any generic relational dataset stored in an SQL data warehouse. Users of time-series databases can take advantage of this primitive on time-series data stored in such special-purpose databases.

The various embodiments that are described herein are described with reference, where appropriate, to one or more of the various figures. An example computing environment using a query plan manager (QPM) performing the disclosed techniques for query plan optimization and modification for queries using an AS OF JOIN operation is discussed in connection with FIGS. 1-3. Example AS OF JOIN processing applied to a preserved and a reference table is discussed in connection with FIG. 4-FIG. 8. Examples of physical optimization and modification of a query plan including an AS OF JOIN operation are discussed in connection with FIG. 9-FIG. 14. Example logical optimizations that can be applied during a query plan modification for a query plan including an AS OF JOIN operation is discussed in connection with FIG. 15-FIG. 27. An example method for processing a query including an AS OF JOIN operation is discussed in connection with FIG. 28. A more detailed discussion of example computing devices that may be used in connection with the disclosed techniques is provided in connection with FIG. 29.

FIG. 1 illustrates an example computing environment 100 that includes a network-based database system 102 including a query plan manager (QPM) and an execution platform in communication with a cloud storage platform, in accordance with some embodiments of the present disclosure. To avoid obscuring the inventive subject matter with unnecessary detail, various functional components that are not germane to conveying an understanding of the inventive subject matter have been omitted from FIG. 1. However, a skilled artisan will readily recognize that various additional functional components may be included as part of the computing environment 100 to facilitate additional functionality that is not specifically described herein. In other embodiments, the computing environment may comprise another type of network-based database system or a cloud data platform. For example, in some aspects, the computing environment 100 may include a cloud computing platform 101 with the network-based database system 102, storage platforms 104 and 122. The cloud computing platform 101 provides computing resources and storage resources that may be acquired (purchased) or leased (e.g., by users such as data providers and data consumers) and configured to execute applications and store data.

The cloud computing platform 101 may host a cloud computing service 103 that facilitates storage of data on the cloud computing platform 101 (e.g., data management and access) and analysis functions (e.g., SQL queries, analysis), as well as other processing capabilities (e.g., performing the attribute store configuration functions described herein). The cloud computing platform 101 may include a three-tier architecture: data storage (e.g., storage platforms 104 and 122), an execution platform 110, and a compute service manager 108 providing query plan configuration and management services (e.g., functionalities of the QPM 128 to configure and manage query plan modification and optimization in connection with scheduling execution of queries that contain an AS OF JOIN operation).

It is often the case that organizations that are customers of a given data platform also maintain data storage (e.g., a data lake) that is external to the data platform (i.e., one or more external storage locations). For example, a company could be a customer of a particular data platform and also separately maintain storage of any number of files—be they unstructured files, semi-structured files, structured files, and/or files of one or more other types-on, as examples, one or more of their servers and/or on one or more cloud-storage platforms such as AMAZON WEB SERVICES™ (AWS™), MICROSOFT® AZURE®, GOOGLE CLOUD PLATFORM™, and/or the like. The customer's servers and cloud-storage platforms are both examples of what a given customer could use as what is referred to herein as an external storage location. The cloud computing platform 101 could also use a cloud-storage platform as what is referred to herein as an internal storage location concerning the data platform.

From the perspective of the network-based database system 102 of the cloud computing platform 101, one or more files that are stored at one or more storage locations are referred to herein as being organized into one or more of what is referred to herein as either "internal stages" or "external stages." Internal stages are stages that correspond to data storage at one or more internal storage locations, and where external stages are stages that correspond to data storage at one or more external storage locations. In this regard, external files can be stored in external stages at one or more external storage locations, and internal files can be stored in internal stages at one or more internal storage locations, which can include servers managed and controlled by the same organization (e.g., company) that manages and controls the data platform, and which can instead or in addition include data-storage resources operated by a storage provider (e.g., a cloud-storage platform) that is used by the data platform for its "internal" storage. The internal storage of a data platform is also referred to herein as the "storage platform" of the data platform. It is further noted that a given external file that a given customer stores at a given external storage location may or may not be stored in an external stage in the external storage location—i.e., in some data-platform implementations, it is a customer's choice whether to create one or more external stages (e.g., one or more external-stage objects) in the customer's data-platform account as an organizational and functional construct for conveniently interacting via the data platform with one or more external files.

As shown, the network-based database system 102 of the cloud computing platform 101 is in communication with the storage platforms 104 and 122 (e.g., AWS®, Microsoft Azure Blob Storage®, or Google Cloud Storage), client device 114 (e.g., a data provider), and data consumer 116 via network 106. The network-based database system 102 is a network-based system used for reporting and analysis of integrated data from one or more disparate sources including one or more storage locations within the storage platform 104. The storage platform 104 comprises a plurality of computing machines and provides on-demand computer system resources such as data storage and computing power to the network-based database system 102.

The network-based database system 102 comprises a compute service manager 108, an execution platform 110, and one or more metadata databases 112. The network-based database system 102 hosts and provides data reporting and analysis services (as well as additional services such as the disclosed task queue management functions) to multiple client accounts, including an account of the data provider associated with client device 114 and an account of the data consumer 116. In some embodiments, the compute service manager 108 comprises the QPM 128 which can be used in connection with configuring and managing query plan modification and optimization in connection with scheduling execution of queries that contain an AS OF JOIN operation. A more detailed description of the functions provided by the QPM 128 is provided in connection with FIGS. 4-28.

The compute service manager 108 coordinates and manages operations of the network-based database system 102. The compute service manager 108 also performs query optimization and compilation as well as managing clusters of computing services that provide compute resources (also referred to as "virtual warehouses"). The compute service manager 108 can support any number of client accounts such as end-users providing data storage and retrieval requests, accounts of data providers, accounts of data consumers, system administrators managing the systems and methods described herein, and other components/devices that interact with the compute service manager 108.

The compute service manager 108 is also in communication with a client device 114. The client device 114 corresponds to a user of one of the multiple client accounts (e.g., a data provider or another type of user) supported by the network-based database system 102. The data provider may utilize application connector 118 at the client device 114 to submit data storage, retrieval, and analysis requests to the compute service manager 108 as well as to access or configure other services provided by the compute service manager 108 (e.g., services associated with the disclosed functions to configure and manage query plan modification and optimization in connection with scheduling execution of queries that contain an AS OF JOIN operation).

Client device 114 (also referred to as user device 114) may include one or more of a laptop computer, a desktop computer, a mobile phone (e.g., a smartphone), a tablet computer, a cloud-hosted computer, cloud-hosted serverless processes, or other computing processes or devices may be used to access services provided by the cloud computing platform 101 (e.g., cloud computing service 103) by way of a network 106, such as the Internet or a private network.

In the description below, actions are ascribed to users, particularly consumers, and providers. Such actions shall be understood to be performed concerning client devices (or devices) 114 operated by such users. For example, a notification to a user may be understood to be a notification transmitted to the client device 114, input or instruction from a user may be understood to be received by way of the client device 114, and interaction with an interface by a user shall be understood to be interaction with the interface on the client device 114. In addition, database operations (joining, aggregating, analysis, etc.) ascribed to a user (consumer or provider) shall be understood to include performing such actions by the cloud computing service 103 in response to an instruction from that user.

In some aspects, a data consumer 116 can communicate with the client device 114 to access functions offered by the data provider. Additionally, the data consumer can access functions (e.g., attribute store-related functions including providing features and metrics used in ML and BI-related processing) offered by the network-based database system 102 via network 106.

The compute service manager 108 is also coupled to one or more metadata databases 112 that store metadata about various functions and aspects associated with the network-based database system 102 and its users. For example, a metadata database of the one or more metadata databases 112 may include a summary of data stored in remote data storage systems as well as data available from a local cache. Additionally, a metadata database of the one or more metadata databases 112 may include information regarding how data is organized in remote data storage systems (e.g., the storage platform 104) and the local caches. Information stored by a metadata database of the one or more metadata databases 112 allows systems and services to determine whether a piece of data needs to be accessed without loading or accessing the actual data from a storage device.

The compute service manager 108 is further coupled to the execution platform 110, which provides multiple computing resources (e.g., execution nodes) that execute, for example, various data storage, data retrieval, and data processing tasks. The execution platform 110 is coupled to storage platforms 104 and 122. The storage platform 104 comprises multiple data storage devices 120-1 to 120-N. In some embodiments, the data storage devices 120-1 to 120-N are cloud-based storage devices located in one or more geographic locations. For example, the data storage devices 120-1 to 120-N may be part of a public cloud infrastructure or a private cloud infrastructure. The data storage devices 120-1 to 120-N may be hard disk drives (HDDs), solid-state drives (SSDs), storage clusters, Amazon S3™ storage systems, or any other data-storage technology. Additionally, the storage platform 104 may include distributed file systems (such as Hadoop Distributed File Systems (HDFS)), object storage systems, and the like. In some embodiments, at least one internal stage 126 may reside on one or more of the data storage devices 120-1-120-N, and at least one external stage 124 may reside on one or more of the storage platforms 122.

In some embodiments, communication links between elements of the computing environment 100 are implemented via one or more data communication networks, such as network 106. The one or more data communication networks may utilize any communication protocol and any type of communication medium. In some embodiments, the data communication networks are a combination of two or more data communication networks (or sub-networks) coupled with one another. In alternate embodiments, these communication links are implemented using any type of communication medium and any communication protocol.

The compute service manager 108, the one or more metadata databases 112, the execution platform 110, and the storage platform 104, are shown in FIG. 1 as individual discrete components. However, each of the compute service manager 108, one or more metadata databases 112, execution platform 110, and storage platforms 104 and 122 may be implemented as a distributed system (e.g., distributed across multiple systems/platforms at multiple geographic locations). Additionally, each of the compute service manager 108, one or more metadata databases 112, execution platform 110, and storage platforms 104 and 122 can be scaled up or down (independently of one another) depending on changes to the requests received and the changing needs of the network-based database system 102. Thus, in the described embodiments, the network-based database system 102 is dynamic and supports regular changes to meet the current data processing needs.

During typical operation, the network-based database system 102 processes multiple jobs determined by the compute service manager 108. These jobs are scheduled and managed by the compute service manager 108 to determine when and how to execute the job. For example, the compute service manager 108 may divide the job into multiple discrete tasks and may determine what data is needed to execute each of the multiple discrete tasks. The compute service manager 108 may assign each of the multiple discrete tasks to one or more nodes of the execution platform 110 to process the task. The compute service manager 108 may determine what data is needed to process a task and further determine which nodes within the execution platform 110 are best suited to process the task. Some nodes may have already cached the data needed to process the task and, therefore, be a good candidate for processing the task. Metadata stored in a metadata database of the one or more metadata databases 112 assists the compute service manager 108 in determining which nodes in the execution platform 110 have already cached at least a portion of the data needed to process the task. One or more nodes in the execution platform 110 process the task using data cached by the nodes and, if necessary, data retrieved from the storage platform 104. It is desirable to retrieve as much data as possible from caches within the execution platform 110 because the retrieval speed is typically much faster than retrieving data from the storage platform 104.

As shown in FIG. 1, the cloud computing platform 101 of the computing environment 100 separates the execution platform 110 from the storage platform 104. In this arrangement, the processing resources and cache resources in the execution platform 110 operate independently of the data storage devices 120-1 to 120-N in the storage platform 104. Thus, the computing resources and cache resources are not restricted to specific data storage devices 120-1 to 120-N. Instead, all computing resources and all cache resources may retrieve data from, and store data to, any of the data storage resources in the storage platform 104.

Figure 2:
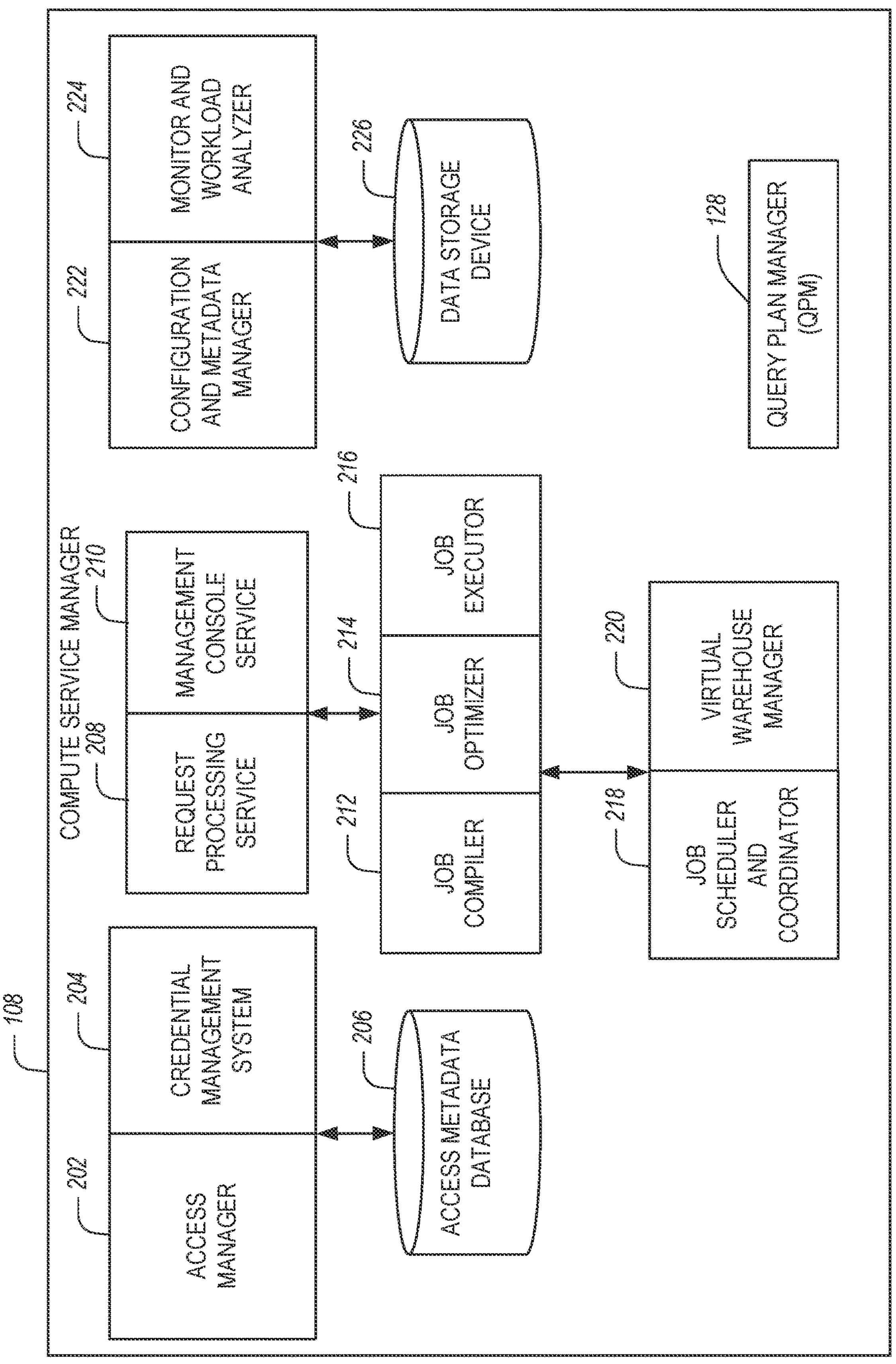
FIG. 2 is a diagram illustrating the components of a compute service manager of the network-based database system of FIG. 1 including the QPM, in accordance with some embodiments of the present disclosure.

FIG. 2 is a diagram illustrating the components of the compute service manager 108 of the network-based database system of FIG. 1 including the QPM 128, in accordance with some embodiments of the present disclosure. As shown in FIG. 2, the compute service manager 108 includes an access manager 202 and a credential management system 204 coupled to an access metadata database 206, which is an example of the one or more metadata databases 112. Access manager 202 handles authentication and authorization tasks for the systems described herein. The credential management system 204 facilitates the use of remotely stored credentials to access external resources such as data resources in a remote storage device. As used herein, the remote storage devices may also be referred to as "persistent storage devices" or "shared storage devices." For example, the credential management system 204 may create and maintain remote credential store definitions and credential objects (e.g., in the access metadata database 206). A remote credential store definition identifies a remote credential store and includes access information to access security credentials from the remote credential store. A credential object identifies one or more security credentials using non-sensitive information (e.g., text strings) that are to be retrieved from a remote credential store for use in accessing an external resource. When a request invoking an external resource is received at run time, the credential management system 204 and access manager 202 use information stored in the access metadata database 206 (e.g., a credential object and a credential store definition) to retrieve security credentials used to access the external resource from a remote credential store.

A request processing service 208 manages received data storage requests and data retrieval requests (e.g., jobs to be performed on database data). For example, the request processing service 208 may determine the data to process a received query (e.g., a data storage request or data retrieval request). The data may be stored in a cache within the execution platform 110 or in a data storage device in storage platform 104.

A management console service 210 supports access to various systems and processes by administrators and other system managers. Additionally, the management console service 210 may receive a request to execute a job and monitor the workload on the system.

The compute service manager 108 also includes a job compiler 212, a job optimizer 214, and a job executor 216. The job compiler 212 parses a job into multiple discrete tasks and generates the execution code for each of the multiple discrete tasks. The job optimizer 214 determines the best method to execute the multiple discrete tasks based on the data that needs to be processed. Job optimizer 214 also handles various data pruning operations and other data optimization techniques to improve the speed and efficiency of executing the job. The job executor 216 executes the execution code for jobs received from a queue or determined by the compute service manager 108.

A job scheduler and coordinator 218 sends received jobs to the appropriate services or systems for compilation, optimization, and dispatch to the execution platform 110. For example, jobs may be prioritized and then processed in that prioritized order. In an embodiment, the job scheduler and coordinator 218 determines a priority for internal jobs that are scheduled by the compute service manager 108 with other "outside" jobs such as user queries that may be scheduled by other systems in the database but may utilize the same processing resources in the execution platform 110. In some embodiments, the job scheduler and coordinator 218 identifies or assigns particular nodes in the execution platform 110 to process particular tasks. A virtual warehouse manager 220 manages the operation of multiple virtual warehouses implemented in the execution platform 110. For example, the virtual warehouse manager 220 may generate query plans for executing received queries.

Additionally, the compute service manager 108 includes configuration and metadata manager 222, which manages the information related to the data stored in the remote data storage devices and the local buffers (e.g., the buffers in the execution platform 110). Configuration and metadata manager 222 uses metadata to determine which data files need to be accessed to retrieve data for processing a particular task or job. A monitor and workload analyzer 224 oversees processes performed by the compute service manager 108 and manages the distribution of tasks (e.g., workload) across the virtual warehouses and execution nodes in the execution platform 110. The monitor and workload analyzer 224 also redistributes tasks, as needed, based on changing workloads throughout the network-based database system 102 and may further redistribute tasks based on a user (e.g., "external") query workload that may also be processed by the execution platform 110. The configuration and metadata manager 222 and the monitor and workload analyzer 224 are coupled to a data storage device 226. The data storage device 226 in FIG. 2 represents any data storage device within the network-based database system 102. For example, data storage device 226 may represent buffers in execution platform 110, storage devices in storage platform 104, or any other storage device.

As described in embodiments herein, the compute service manager 108 validates all communication from an execution platform (e.g., the execution platform 110) to validate that the content and context of that communication are consistent with the task(s) known to be assigned to the execution platform. For example, an instance of the execution platform executing query A should not be allowed to request access to data source D (e.g., data storage device 226) that is not relevant to query A. Similarly, a given execution node (e.g., execution node 302-1 may need to communicate with another execution node (e.g., execution node 302-2), and should be disallowed from communicating with a third execution node (e.g., execution node 312-1) and any such illicit communication can be recorded (e.g., in a log or other location). Also, the information stored on a given execution node is restricted to data relevant to the current query and any other data is unusable, rendered so by destruction or encryption where the key is unavailable.

In some embodiments, the compute service manager 108 further includes the QPM 128 which can be used in connection with configuring and managing query plan modification and optimization in connection with scheduling execution of queries that contain an AS OF JOIN operation.

Figure 3:
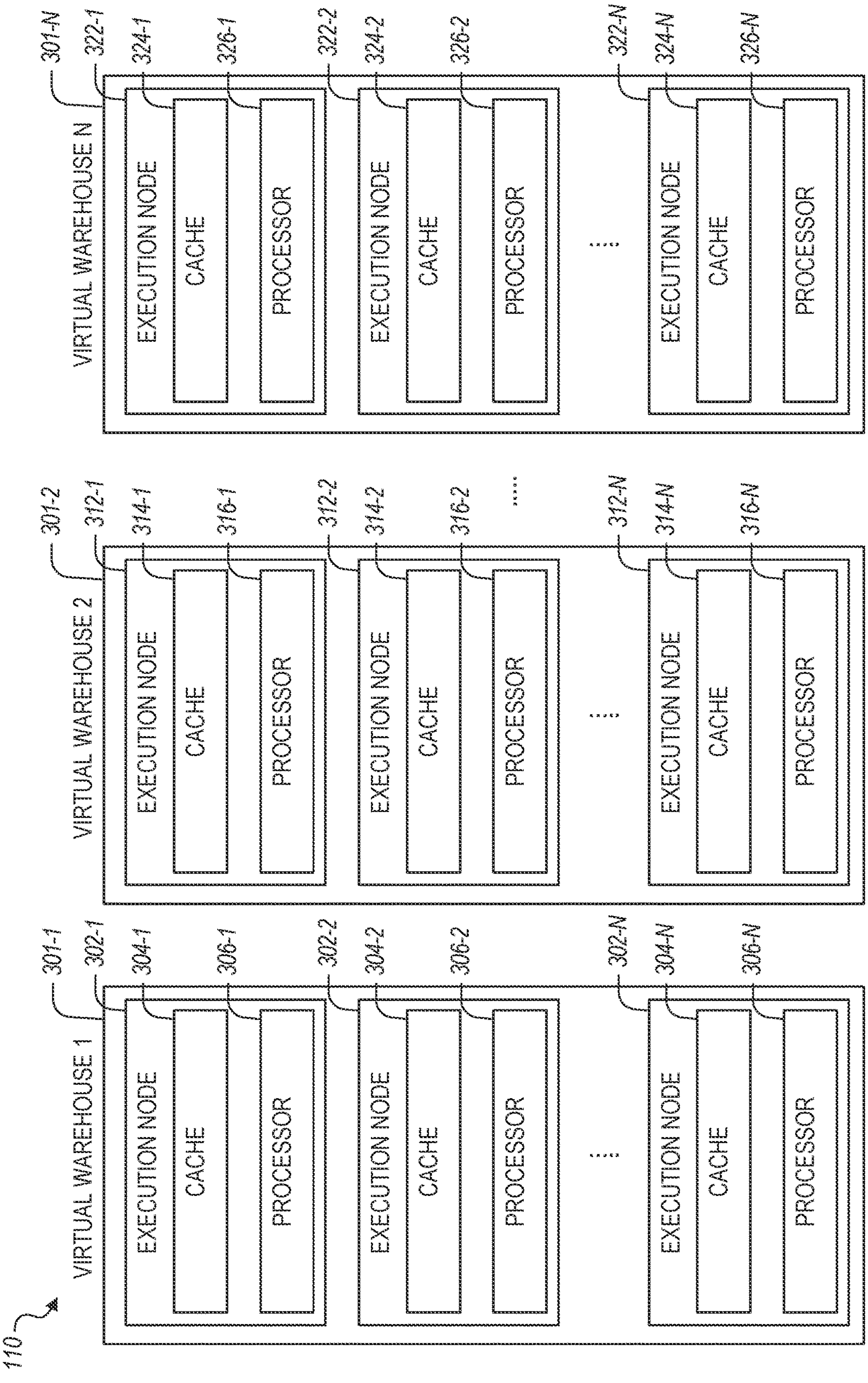
FIG. 3 is a diagram illustrating components of an execution platform, in accordance with some embodiments of the present disclosure.

FIG. 3 is a block diagram illustrating components of the execution platform 110, in accordance with some embodiments of the present disclosure. As shown in FIG. 3, the execution platform 110 includes multiple virtual warehouses, including virtual warehouse 1 (or 301-1), virtual warehouse 2 (or 301-2), and virtual warehouse N (or 301-N). Each virtual warehouse includes multiple execution nodes that each include a data cache and a processor. The virtual warehouses can execute multiple tasks in parallel by using multiple execution nodes. As discussed herein, the execution platform 110 can add new virtual warehouses and drop existing virtual warehouses in real-time based on the current processing needs of the systems and users. This flexibility allows the execution platform 110 to quickly deploy large amounts of computing resources when needed without being forced to continue paying for those computing resources when they are no longer needed. All virtual warehouses can access data from any data storage device (e.g., any storage device in the storage platform 104).

Although each virtual warehouse shown in FIG. 3 includes three execution nodes, a particular virtual warehouse may include any number of execution nodes. Further, the number of execution nodes in a virtual warehouse is dynamic, such that new execution nodes are created when additional demand is present, and existing execution nodes are deleted when they are no longer necessary.

Each virtual warehouse is capable of accessing any of the data storage devices 120-1 to 120-N shown in FIG. 1. Thus, the virtual warehouses are not necessarily assigned to a specific data storage device 120-1 to 120-N and, instead, can access data from any of the data storage devices 120-1 to 120-N within the storage platform 104. Similarly, each of the execution nodes shown in FIG. 3 can access data from any of the data storage devices 120-1 to 120-N. In some embodiments, a particular virtual warehouse or a particular execution node may be temporarily assigned to a specific data storage device, but the virtual warehouse or execution node may later access data from any other data storage device.

In the example of FIG. 3, virtual warehouse 1 includes three execution nodes 302-1, 302-2, and 302-N. Execution node 302-1 includes a cache 304-1 and a processor 306-1. Execution node 302-2 includes a cache 304-2 and a processor 306-2. Execution node 302-N includes a cache 304-N and a processor 306-N. Each execution node 302-1, 302-2, and 302-N is associated with processing one or more data storage and/or data retrieval tasks. For example, a virtual warehouse may handle data storage and data retrieval tasks associated with an internal service, such as a clustering service, a materialized view refresh service, a file compaction service, a storage procedure service, or a file upgrade service. In other implementations, a particular virtual warehouse may handle data storage and data retrieval tasks associated with a particular data storage system or a particular category of data.

Similar to virtual warehouse 1 discussed above, virtual warehouse 2 includes three execution nodes 312-1, 312-2, and 312-N. Execution node 312-1 includes a cache 314-1 and a processor 316-1. Execution node 312-2 includes a cache 314-2 and a processor 316-2. Execution node 312-N includes a cache 314-N and a processor 316-N. Additionally, virtual warehouse 3 includes three execution nodes 322-1, 322-2, and 322-N. Execution node 322-1 includes a cache 324-1 and a processor 326-1. Execution node 322-2 includes a cache 324-2 and a processor 326-2. Execution node 322-N includes a cache 324-N and a processor 326-N.

In some embodiments, the execution nodes shown in FIG. 3 are stateless concerning the data being cached by the execution nodes. For example, these execution nodes do not store or otherwise maintain state information about the execution node or the data being cached by a particular execution node. Thus, in the event of an execution node failure, the failed node can be transparently replaced by another node. Since there is no state information associated with the failed execution node, the new (replacement) execution node can easily replace the failed node without concern for recreating a particular state.

Although the execution nodes shown in FIG. 3 each includes one data cache and one processor, alternative embodiments may include execution nodes containing any number of processors and any number of caches. Additionally, the caches may vary in size among the different execution nodes. The caches shown in FIG. 3 store, in the local execution node, data that was retrieved from one or more data storage devices in the storage platform 104. Thus, the caches reduce or eliminate the bottleneck problems occurring in platforms that consistently retrieve data from remote storage systems. Instead of repeatedly accessing data from the remote storage devices, the systems and methods described herein access data from the caches in the execution nodes, which is significantly faster and avoids the bottleneck problem discussed above. In some embodiments, the caches are implemented using high-speed memory devices that provide fast access to the cached data. Each cache can store data from any of the storage devices in the storage platform 104.

Further, the cache resources and computing resources may vary between different execution nodes. For example, one execution node may contain significant computing resources and minimal cache resources, making the execution node useful for tasks that require significant computing resources. Another execution node may contain significant cache resources and minimal computing resources, making this execution node useful for tasks that require caching of large amounts of data. Yet another execution node may contain cache resources providing faster input-output operations, useful for tasks that require fast scanning of large amounts of data. In some embodiments, the cache resources and computing resources associated with a particular execution node are determined when the execution node is created, based on the expected tasks to be performed by the execution node.

Additionally, the cache resources and computing resources associated with a particular execution node may change over time based on changing tasks performed by the execution node. For example, an execution node may be assigned more processing resources if the tasks performed by the execution node become more processor-intensive. Similarly, an execution node may be assigned more cache resources if the tasks performed by the execution node require a larger cache capacity.

Although virtual warehouses 1, 2, and N are associated with the same execution platform 110, virtual warehouses 1, . . . , N may be implemented using multiple computing systems at multiple geographic locations. For example, virtual warehouse 1 can be implemented by a computing system at a first geographic location, while virtual warehouses 2 and n are implemented by another computing system at a second geographic location. In some embodiments, these different computing systems are cloud-based computing systems maintained by one or more different entities.

Additionally, each virtual warehouse is shown in FIG. 3 as having multiple execution nodes. The multiple execution nodes associated with each virtual warehouse may be implemented using multiple computing systems at multiple geographic locations. For example, an instance of virtual warehouse 1 implements execution nodes 302-1 and 302-2 on one computing platform at a geographic location, and execution node 302-N at a different computing platform at another geographic location. Selecting particular computing systems to implement an execution node may depend on various factors, such as the level of resources needed for a particular execution node (e.g., processing resource requirements and cache requirements), the resources available at particular computing systems, communication capabilities of networks within a geographic location or between geographic locations, and which computing systems are already implementing other execution nodes in the virtual warehouse.

Execution platform 110 is also fault-tolerant. For example, if one virtual warehouse fails, that virtual warehouse is quickly replaced with a different virtual warehouse at a different geographic location.

A particular execution platform 110 may include any number of virtual warehouses. Additionally, the number of virtual warehouses in a particular execution platform is dynamic, such that new virtual warehouses are created when additional processing and/or caching resources are needed. Similarly, existing virtual warehouses may be deleted when the resources associated with the virtual warehouse are no longer necessary.

In some embodiments, the virtual warehouses may operate on the same data in the storage platform 104, but each virtual warehouse has its execution nodes with independent processing and caching resources. This configuration allows requests on different virtual warehouses to be processed independently and with no interference between the requests. This independent processing, combined with the ability to dynamically add and remove virtual warehouses, supports the addition of new processing capacity for new users without impacting the performance observed by the existing users.

In some aspects, QPM 128 can support the configuration and processing of AS OF JOIN as a native SQL syntax. More specifically, users of the network-based database system 102 can create queries using AS OF JOIN similar to using other joins in SQL. This allows users to perform AS OF JOIN on arbitrary tables/views or subquery in their data warehouse. In some aspects, QPM 128 can be configured to process an AS OF JOIN operation using the following syntax listed in Table 1:

TABLE 1

```
SELECT <expressions_list>
FROM <preserving_table>
ASOF JOIN <reference_table>
MATCH_CONDITION (
<timestamp_range_condition>
[ <options> // open for extension
)
[ON <equi_cond_list> ]
```

The <preserving_table> and <reference_table> can be any arbitrary SQL table expression. The <timestamp_range_condition> can be any binary range comparison function, and the argument can be an arbitrary SQL expression with compatible data types. In some aspects, by extending <options>, more configuration options can be supported, including (a) matching the closest timestamp regardless of preceding or following; and (b) only matching timestamps within a certain specified range.

In some aspects, QPM 128 can configure AS OF JOIN processing similar to a LATERAL JOIN or an OUTER JOIN in connection with it having a directional implication, the left side being the preserved table and the right side being a non-preserved or referenced table. For each row in the left table, the AS OF JOIN finds one matching row from the right table, where its timestamp is the maximum among all rows having a timestamp less than or equal to the timestamp of the row in the left table. In short, each row on the left tries to find the last row on the right that happened before it. There can be additional equijoin conditions, which can serve as logical partitions.

Figure 4:
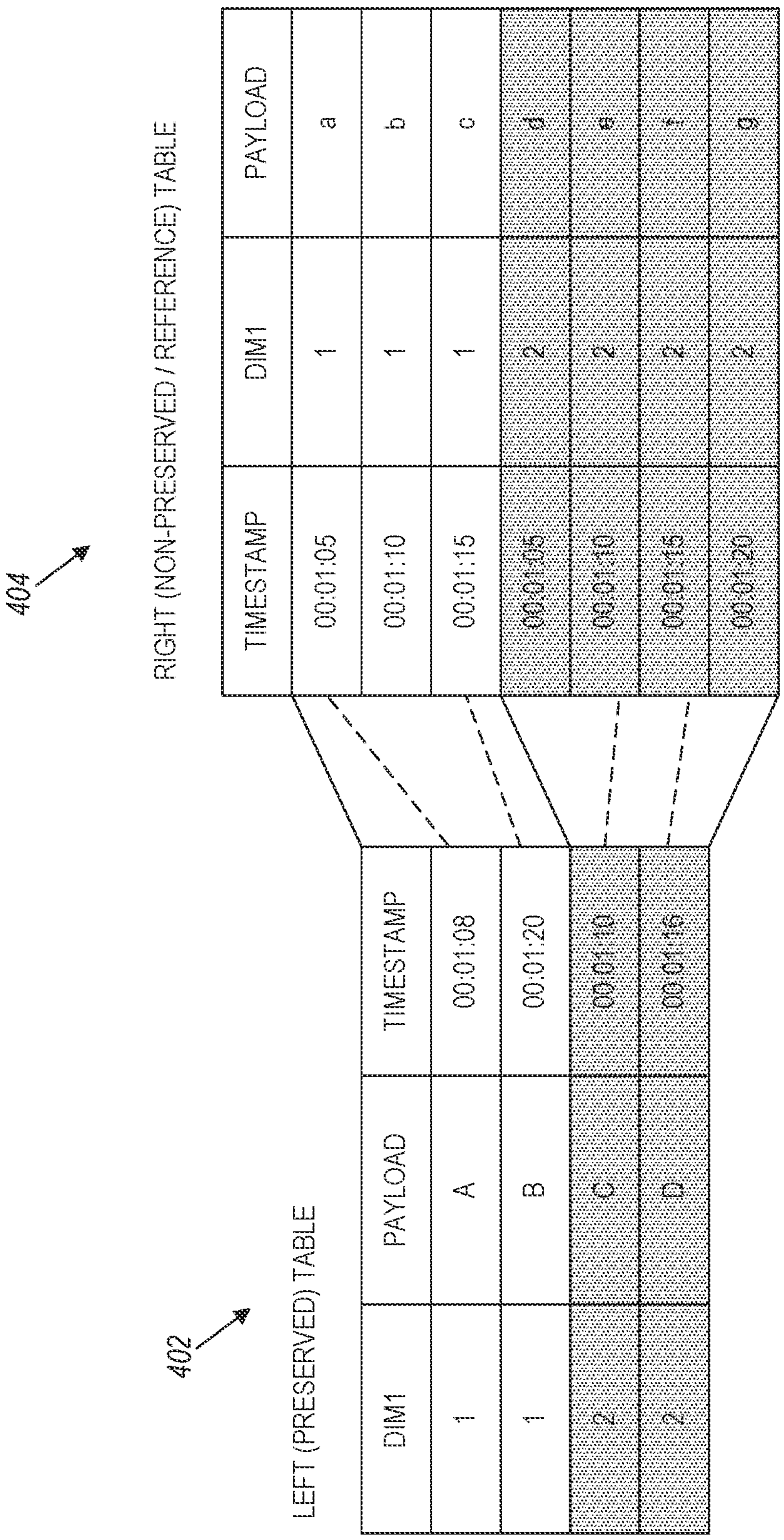
FIG. 4 is a diagram illustrating AS OF JOIN processing applied on a preserved table and a non-preserved (or reference) table, in accordance with some embodiments of the present disclosure.

FIG. 4 is a diagram illustrating AS OF JOIN processing (e.g., by QPM 128) applied on a preserved table 402 (also referred to as a left table or a preserving table) and a non-preserved table 404 (also referred to as a reference table or a right table), in accordance with some embodiments of the present disclosure.

Referring to FIG. 4, the left side and the right side tables are first partitioned by the <dim1> column. Each row in the preserved table 402 finds the last row in the non-preserved table 404 that has a smaller or equal timestamp within the partition. The first row of the left table with payload 'A' matches the first row on the right table because its timestamp 00:01:05 is smaller than the timestamp 00:01:08 of the first row of the left table. The second row of the left table with payload 'B' has three rows in the right table that have a smaller timestamp than itself, but only the third row in the right table (with payload 'c') matches because it has the biggest timestamp of the three. If there are no rows that have a smaller or equal timestamp, the right side will be null-padded.

As seen in FIG. 4, the cardinality of the result of the AS OF JOIN is the same as the cardinality of the preserved table 402.

In some aspects, an asterisk (*) of the Select clause that is included in an AS OF JOIN operation on two tables is resolved as the concatenation of all the columns from the left side and the right side. This behavior is equivalent to the query listed in Table 2 below.

TABLE 2

```
select * from LeftTable
left join lateral
(
select * from RightTable
where RightTable.dim1 = LeftTable.dim1
and RightTable.timestamp <= LeftTable.timestamp
order by timestamp desc
limit 1
) t2;
```

In some aspects associated with processing queries related to the Financial Services Industry (FSI), there is a demand for enhanced time-series analytics capabilities. While the overall scope of time-series analysis in the FSI space is large, the disclosed techniques can be applied to the historical analysis of tick data (e.g., for back-testing and transaction cost analysis (TCA)). More specifically, the disclosed techniques for configuring and optimizing AS OF JOIN processing can be used to enable analyzing a time series with respect to another time series, or a predefined time distribution. While several use cases such as application metrics (observability) achieve this goal by preprocessing time series and aligning them to predefined time intervals, use cases like TCA align two dynamically changing time series (e.g., trade times in what-if scenarios) on a per query basis. This type of historical analysis is challenging to perform by aligning time series to fixed predefined intervals but may be completed using the disclosed AS OF JOIN semantics and configurations (including query plan optimization and modification by the QPM 128 based on the disclosed techniques).

Additional configurations that can be used by the QPM 128 in processing an AS OF JOIN operation are discussed in connection with FIG. 5 and FIG. 6.

Figure 5:
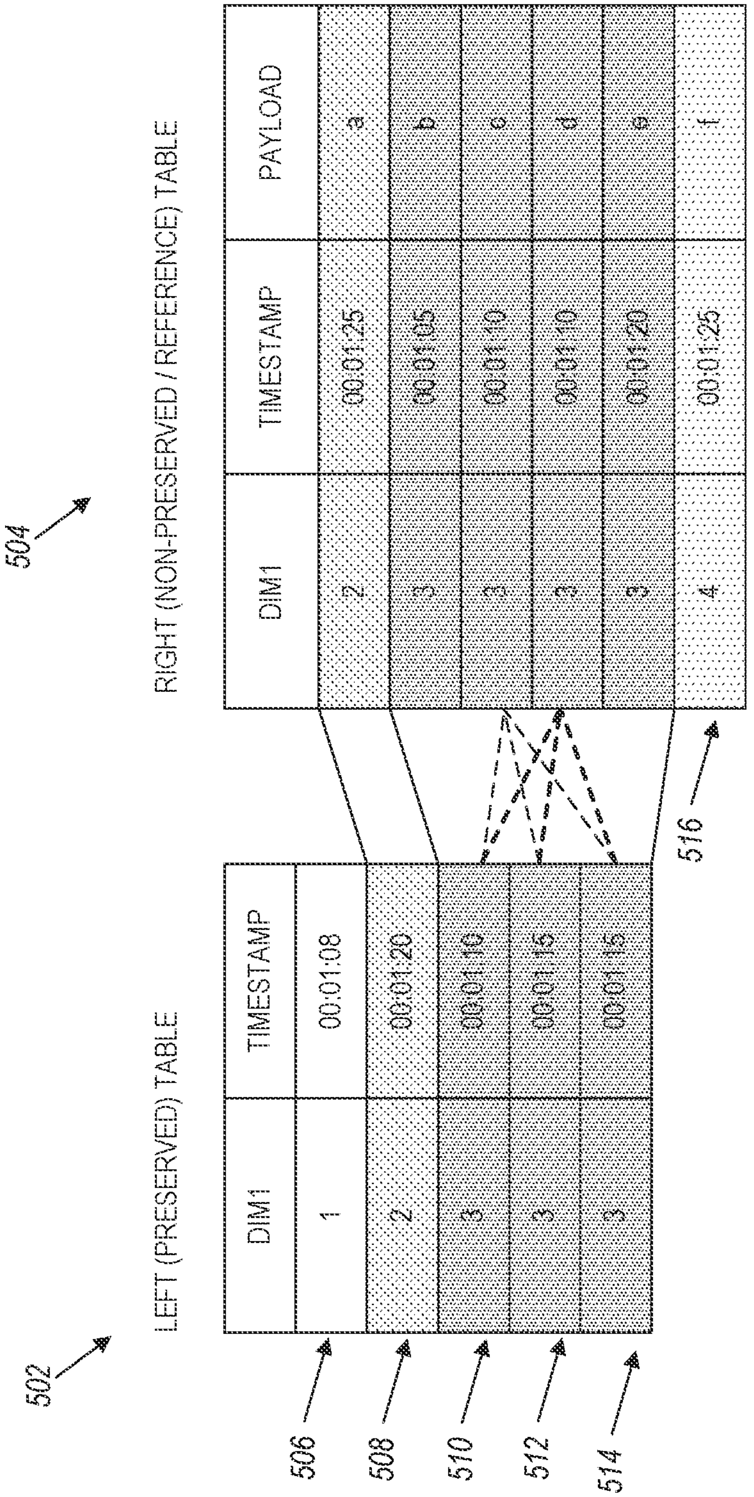
FIG. 5 is a diagram illustrating AS OF JOIN processing applied on a preserved table and a non-preserved (or reference) table, in accordance with some embodiments of the present disclosure.

FIG. 5 is a diagram illustrating AS OF JOIN processing applied on a preserved table 502 and a reference table 504 (or non-preserved table), in accordance with some embodiments of the present disclosure.

FIG. 6 illustrates an output table 602 generated at the completion of the AS OF JOIN operation of FIG. 5, in accordance with some embodiments of the present disclosure.

FIG. 5 can be used to clarify different behaviors and configurations used by the QPM 128 to process an AS OF JOIN operation.

In some aspects, when the row on the left side does not have a matching partition on the right side (e.g., row 506), the row is preserved, with its right side null-padded. This processing is similar to processing a LEFT OUTER JOIN operation.

In some aspects, rows on the left side (e.g., row 508) have matching partitions on the right side, but the partition does not contain any rows that have a timestamp smaller than itself. In this case, QPM 128 can preserve the row from the left side table (preserved table 502) with its right side null-padded. This processing is similar to processing a LEFT OUTER JOIN operation.

In some aspects, a row on the left side (e.g., row 510) has an exactly matching timestamp on the right side (e.g., reference table 504). In this case, QPM 128 matches the row by left.timestamp>=right.timestamp condition. There may be some users who want to achieve left.timestamp>right.timestamp behavior where the rows match when the timestamp of the right table is strictly smaller than the one on the left. This can be worked around using DATEADD(ns, −1, left.timestamp)>=right.timestamp.

In some aspects, a row on the left side (e.g., row 510) has multiple rows of exactly matching timestamps in reference table 504. Even if multiple rows can be matched, QPM 128 can configure the AS OF JOIN to only make its match against a single row on the right side. This can be non-deterministic since the rows are ties. In the example above, the third row on the left (row 510) can either match the third or the fourth row on the right, but it will not match both and the number of rows will not increase.

In some aspects, rows on the left side (e.g., row 512 and row 514) have the same timestamp and dimension (partition) column (e.g., DIM1 column) values. In this case, rows 512 and 514 on the left side remain the same and will not explode or dedupe after the AS OF JOIN completes.

In some aspects, some rows in the reference table 504 (e.g., row 516) do not have a matching row in the preserved table 502. In this case, the non-matched rows on the right side do not appear in the AS OF JOIN result (e.g., output table 602 in FIG. 6).

Figure 7:
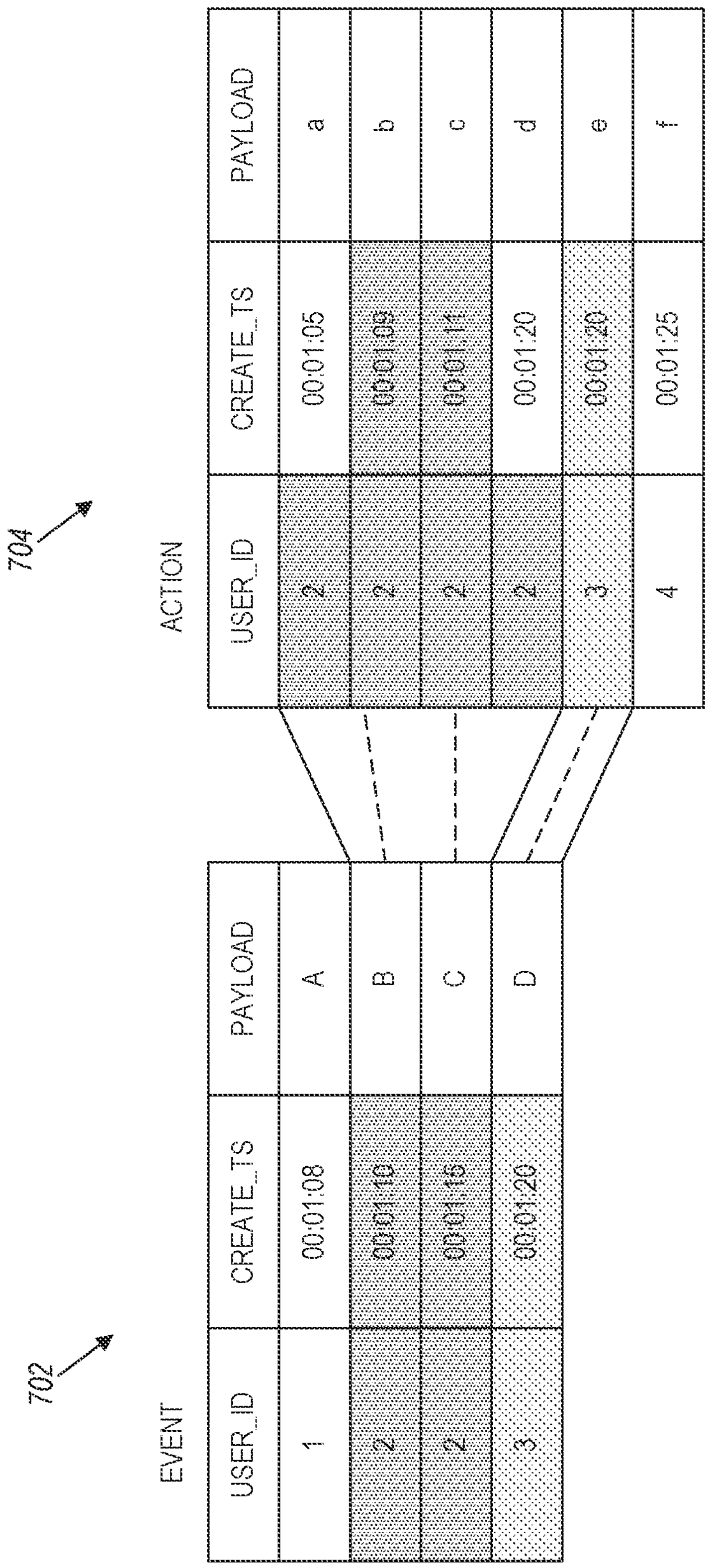
FIG. 7 is a diagram illustrating AS OF JOIN processing applied on a preserved table and a non-preserved (or reference) table, in accordance with some embodiments of the present disclosure.

FIG. 7 is a diagram illustrating AS OF JOIN processing applied on a preserved table 702 and a reference table 704 (or non-preserved table), in accordance with some embodiments of the present disclosure.

FIG. 8 illustrates an output table 802 generated at the completion of the AS OF JOIN operation of FIG. 7, in accordance with some embodiments of the present disclosure. Referring to FIG. 8, the output table can be further simplified by removing the user ID column of the reference table to obtain output table 804.

In some aspects, QPM 128 can take into account the following restrictions configurations when processing an AS OF JOIN operation based on the syntax listed in Table 1.

(a) <timestamp_range_condition> in <preserving_table_ts_expr><comparison_operator> <reference_table_ts_expr> format.

(b) <preserving_table_timestamp_expr> and <reference_table_timestamp_expr> are numeric or timestamp expressions that only reference the <preserving_table> and the <reference_table> respectively.

(c) <comparison_operator> allows range comparison predicate ">=". Support may be extended to also include predicates ">," "<=," and "<."

(d) <equi_cond_list> consists of equi-join conditions only.

(e) Extensions of <options> can contain:

(e.1) WITHIN RANGE;

(e.2) Whether to match multiple rows in case of ties; and (e.3) Whether to remove rows without match.

(f) The ON clause may be optional, serving as partitioning keys. USING(<col1>, <col2>.) can be used as regular JOINs, which is equivalent to ON t1.<col1>=t2.<col1> and t1.<col2>=t2.<col2>.

In some aspects, QPM 128 is configured to process the AS OF JOIN associated with preserved table 702 (also referred to as Event) and a reference table 704 (also referred to as Action) using the following syntax listed in Table 3.

TABLE 3

```
SELECT * FROM Event
ASOF JOIN Action
MATCH CONDITION ( Event.create_ts >= Action.create_ts )
ON Event.user id = Action.user_id;
```

In some aspects, MATCH_CONDITION with parenthesis can be used in future extensions.

In some aspects, QPM 128 can configure the processing of an AS OF JOIN operation by using the following alternatives of the MATCH_CONDITION keyword:

(a) ASOF_CONDITION. This clause is associated with the ASOF join.

(b) LOOKUP_CONDITION. Emphasizes the fact that the right side of the JOIN serves as a reference table, which can be similar to LOOKUP functionalities in some data systems.

(c) MATCH_NEAREST. This configuration is more specific about the behavior by telling it is matching the nearest values.

(d) LOOKUP_NEAREST. This configuration is a combination of the previous two configurations listed in (b) and (c).

In some aspects, QPM 128 can configure the processing of an AS OF JOIN operation by using the following alternatives of the timestamp range condition:

<preserving_table_timestamp_expr> MATCH<inclusion_option>][<range_cond_option>][<reference_table_timestamp_expr>.

The following restrictions can be used in connection with the timestamp range condition:

(a) <preserving_table_timestamp_expr> and <reference_table_timestamp_expr> are numeric or timestamp expressions from each side.

(b) <inclusion_option> being one of 'INCLUSIVE', 'EXCLUSIVE' (default: 'INCLUSIVE').

(c) <range_cond_option> being one of 'PRECEDING', 'FOLLOWING', 'NEAREST' (default: 'PRECEDING').

(d) <equi_cond_list> consists of equi-join conditions only.

The following are examples of the timestamp expressions that can be processed by the QPM 128:

(a) MATCH_CONDITION(table_1.ts MATCH table_2.ts)=table_1.ts>=table_2.ts.

(b) MATCH_CONDITION(table_1.ts MATCH EXCLUSIVE table_2.ts)=table_1.ts> table_2.ts.

(c) MATCH_CONDITION(table_1.ts MATCH PRECEDING table_2.ts)=table_1.ts>=table_2.ts.

(d) MATCH_CONDITION(table_1.ts MATCH EXCLUSIVE PRECEDING table_2.ts)=table_1.ts> table_2.ts.

In some embodiments, any expression of Date, Time, Timestamp, and Numeric data type will be allowed by QPM 128 for <preserving_table_timestamp_expr> and <reference_table_timestamp_expr> in the AS OF JOIN BY clause. Allowing arbitrary expression as well as column reference enables users to perform what-if analysis (e.g., "What if all trades happened 0.5 seconds earlier?"). In some aspects, aggregations and window functions may not be used in the AS OF JOIN syntax as they are not allowed to be used within any JOIN condition. In some aspects, the implicit casting can be added to make <preserving_table_timestamp_expr> and <reference_table_timestamp_expr> comparable. The same rule of type casting operands of comparison operator can apply.

FIG. 9, FIG. 10, FIG. 11, FIG. 12, FIG. 13, and FIG. 14 illustrate physical optimization and modification of a query plan including the AS OF JOIN operation of FIG. 7 to generate the output table of FIG. 8, in accordance with some embodiments of the present disclosure.

In some embodiments, QPM 128 can evaluate the AS OF JOIN like other types of JOIN operations (e.g., before the WHERE, GROUP BY, and ORDER BY clause). In some aspects, filter predicates in the Where clause that only references the left side can be pushed down to the left side of the AS OF JOIN and evaluated before the AS OF JOIN. If the columns in the filter are contained in the AS OF JOIN's equi-condition, the transitive filter can be generated and pushed down to the right side of the JOIN. Otherwise, if the user wants a filter to be evaluated before the AS OF JOIN, this can be achieved by using a query block in the FROM clause.

In some aspects, QPM 128 can support parse tree optimizations on AS Of JOIN operations. In some aspects, QPM 128 can perform the following optimizations on the AS OF JOIN operation (e.g., when parsing the query to generate a query plan:

(a) Constant folding. For example, constant folding on equi-join conditions (e.g., partition columns) can be applied. Any constant true predicate generated from this process can be removed from the join condition. In some aspects, a constant false filter makes the JOIN produce an empty result.

(b) Constant folding on the timestamp range condition is not likely to happen in real-world processing scenarios (e.g., using AS OF JOIN can be avoided if the time-stamp values are all the same), but it can lead to significant performance improvement since it makes it possible to skip the sorting. However, processing can be based on using the constant property and optimizing according to it (for example, omitting to create sort nodes). In some aspects, constant folding can be applied on each timestamp column from left and right separately.

(c) Filter pushdown. In some aspects, a filter can be pushed down freely to the left side. To push down the filter to the right side, the filter can be configured on the partition columns and can be pushed down to both sides as a transitive filter.

Figure 9:
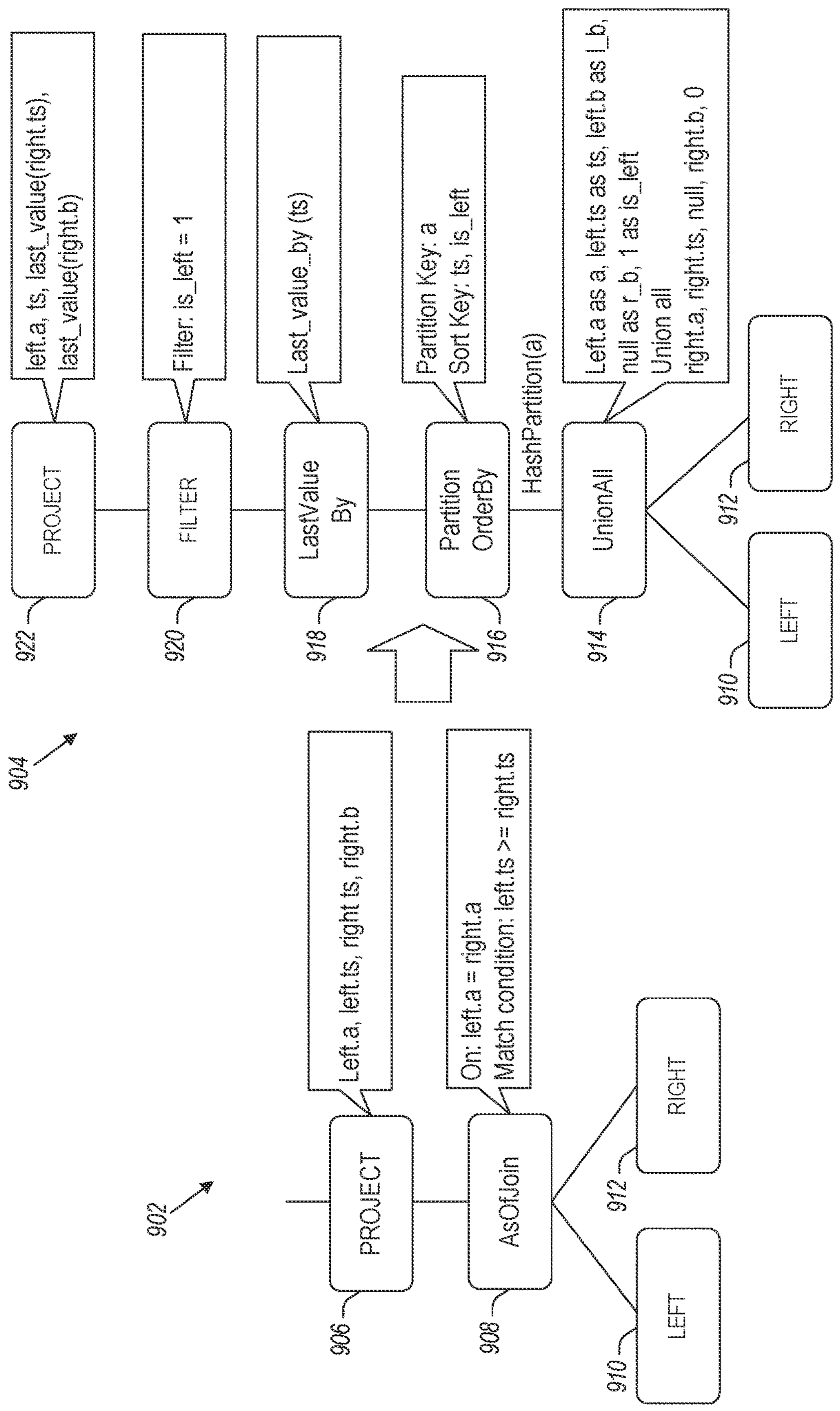

Referring to FIG. 9, QPM 128 can parse a received query to generate a query plan 902. The query plan 902 includes a plurality of nodes representing corresponding operations associated with the received query. In the example of FIG. 9, the received query can be parsed to generate query plan 902 including a PROJECT operation 906 and an AS OF JOIN operation 908 applied to a left table 910 (e.g., a preserved table) and a right table 912 (e.g., a reference table). In some aspects, QPM 128 can generate a modified query plan 904 by replacing the AS OF JOIN operation (and then schedule execution of the modified query plan 904) based on the techniques discussed in connection with FIG. 10-FIG. 14.

The AS OF JOIN operation 908 can be based on the syntax listed in Table 3 above and associated with the tables illustrated in FIGS. 7-8 (e.g., preserved table 702 is the same as the left table 910, and reference table 704 is the same as the right table 912).

Referring to FIG. 11, initially the QPM 128 can apply a UNION operation (e.g., UNION ALL operation 914) using the left table 910 and the right table 912 to determine the last action the user performed before each event. In some aspects, performing the UNION ALL operation is based on performing a UNION operation on the user_id and create_ts (creation timestamp) column data to generate a combined table.

QPM 128 can perform null padding on the other columns from each of the left and right tables, as well as add a new is_left column to generate a modified combined table 1102. The is_left column includes an indicator value to indicate whether the row data is from the left table (e.g., a value of 1 if it is from the left table and 0 if it is from the right table).

Referring to FIG. 12, QPM 128 applies a partitioning operation (e.g., PARTITION) and a sorting operation (e.g., ORDER BY) (collectively referenced as operation 916 in FIG. 9) to generate a sorted table 1202. In some aspects, the partitioning key is column user_id, and the sort keys are the create_ts and is_left data.

Referring to FIG. 13, QPM 128 performs a LastValue operation 918 to add at least one last value column to the sorted table 1202 to generate the modified sorted table 1302. For example, modified sorted table 1302 includes the "action.create_ts" column and the "action.payload" columns from sorted table 1202 but with the removed null values. More specifically, each null value is replaced with the timestamp value or the action payload value appearing in the cell immediately above the null value cell.

Referring to FIG. 14, QPM 128 applies a filtering operation 920 (e.g., a FILTER operation) and a project operation 922 (e.g., a PROJECT operation) to the modified sorted table 1302 to generate a result table 1404 (also referred to as output table). More specifically, QPM 128 performs the filtering operation 920 based on the filtering criteria of is_left=1 (e.g., only rows appearing in the left table are kept) to generate a filtered table 1402. The QPM 128 applies the PROJECT operation 922 to the filtered table 1402 by removing the null columns and generating the result table 1404 as the final output/result of the AS OF JOIN operation 908. As seen in FIG. 14, the result table 1404 is the same as output table 804 in FIG. 8.

In some aspects, QPM 128 generates the modified query plan 904 and then schedules and performs distributed pipeline execution of the operations in the modified query plan 904. For example, in reference to FIG. 10, QPM 128 performs distributed pipeline execution 1002 on the UNION ALL operation 914, and distributed pipeline execution 1004 on the remaining operations in the modified query plan 904. In some embodiments, distributed pipeline execution 1002 and distributed pipeline execution 1004 are performed on the same or different computing nodes of the execution platform 110 of the network-based database system 102.

FIG. 15-FIG. 27 illustrate various logical optimizations that can be applied during a query plan modification for a query plan including an AS OF JOIN operation, in accordance with some embodiments of the present disclosure.

Figure 15:
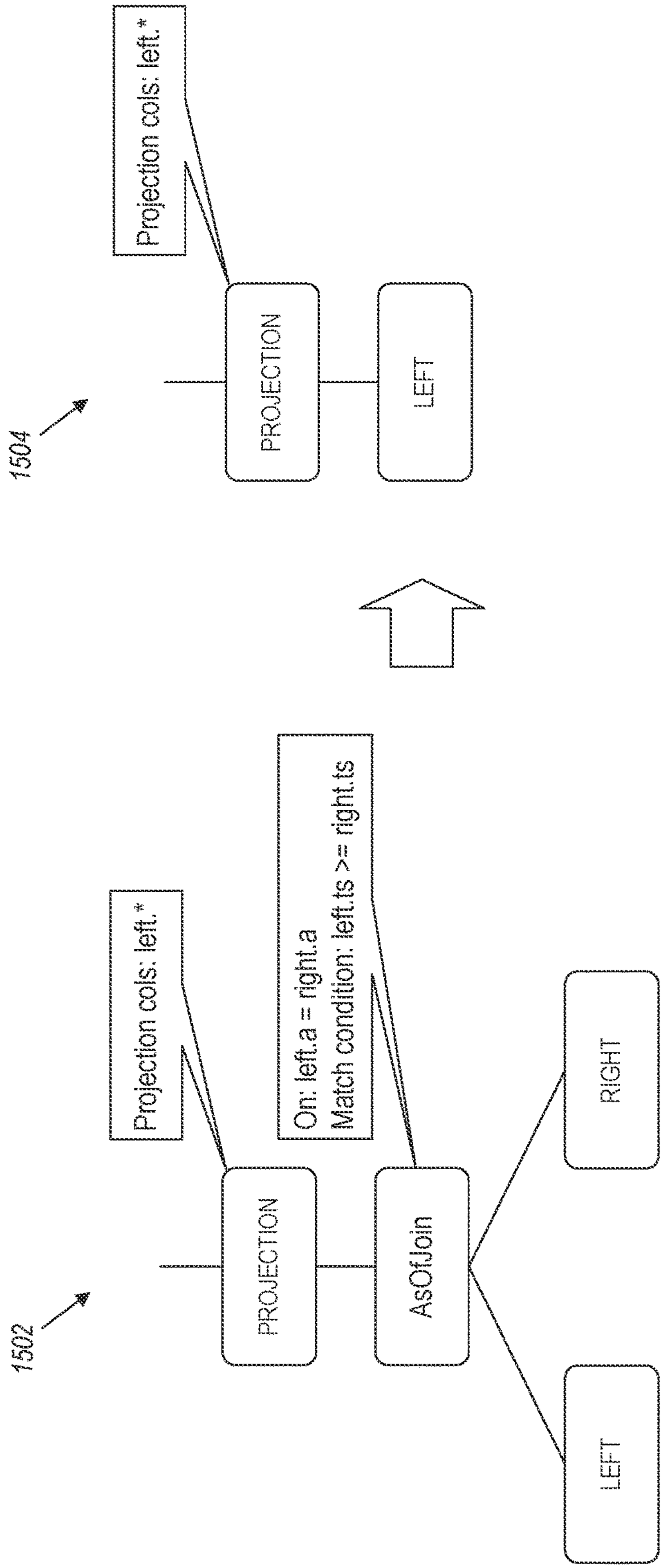
FIG. 15, FIG. 16, FIG. 17, FIG. 18, FIG. 19, FIG. 20, FIG. 21, FIG. 22, FIG. 23, FIG. 24, FIG. 25, FIG. 26, and FIG. 27 illustrate various logical optimizations that can be applied during a query plan modification for a query plan including an AS OF JOIN operation, in accordance with some embodiments of the present disclosure.

Referring to FIG. 15, QPM 128 can transform query plan 1502 to query plan 1504 by eliminating the AS OF JOIN operation when there is no reference of expressions from the right side.

Figure 16:
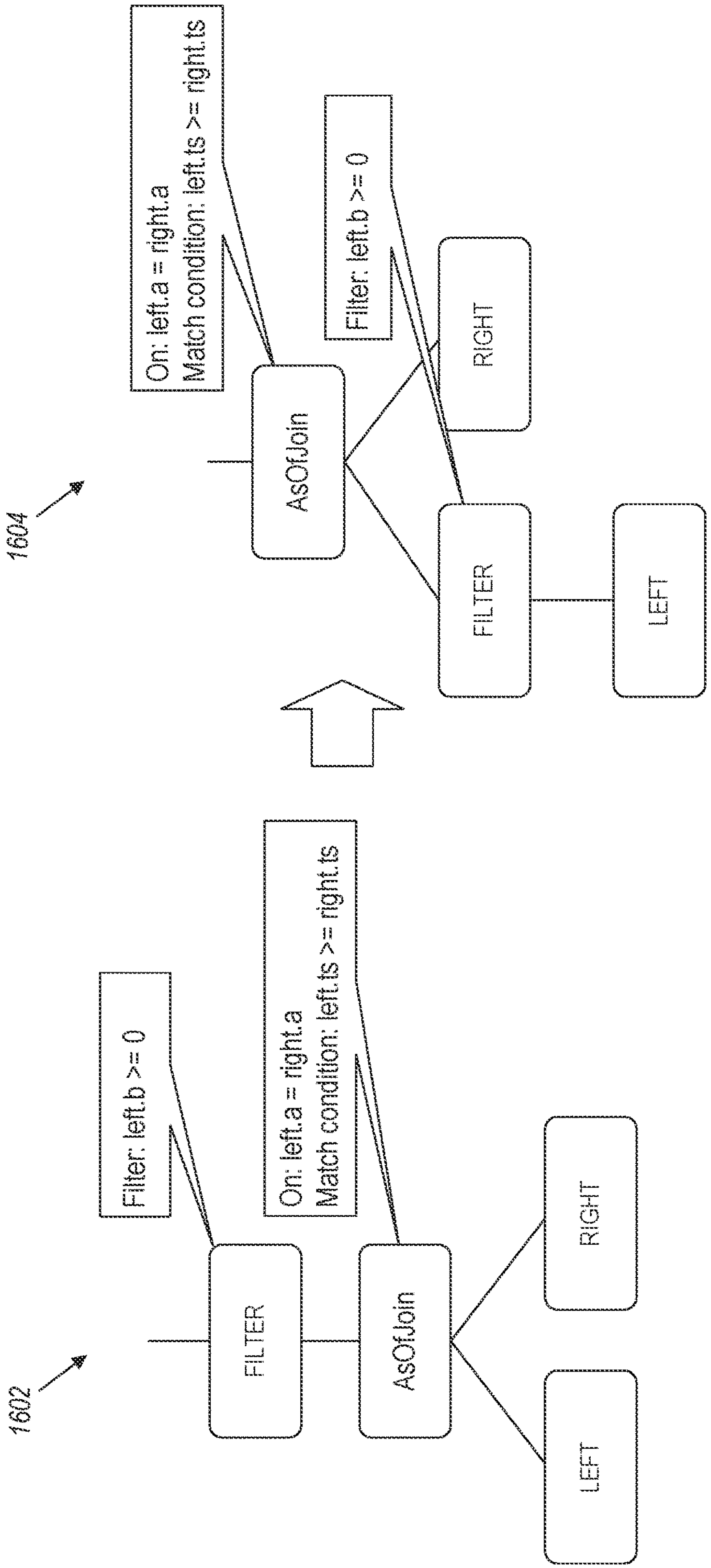

Referring to FIG. 16, QPM 128 can transform query plan 1602 to query plan 1604 by performing a filter push-down of a filter on the left table appearing before the AS OF JOIN operation.

Figure 17:
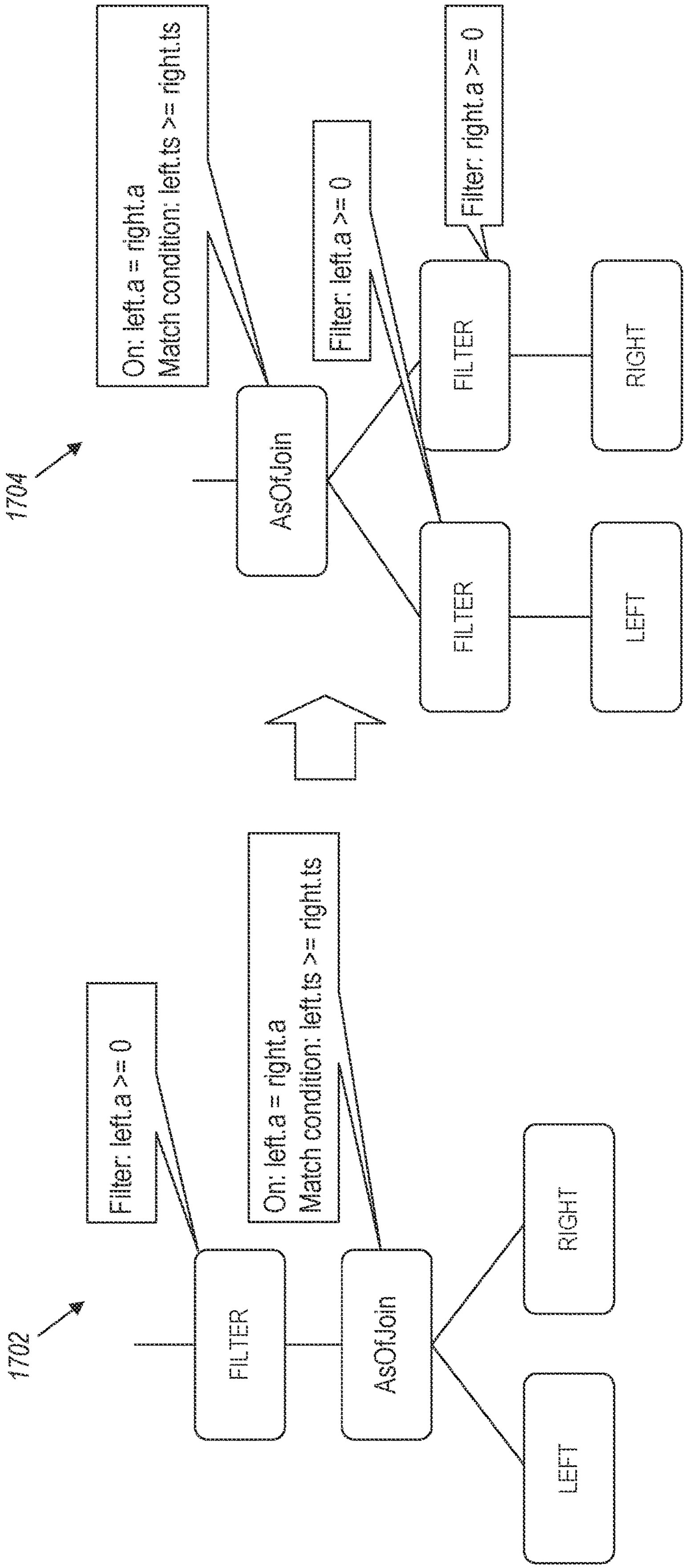

Referring to FIG. 17, QPM 128 can transform a query plan 1702 (including a filter on the left table using the join condition) to query plan 1704 by performing a filter push-down on the AS OF JOIN operation by generating a transitive filter using the join condition.

Figure 18:
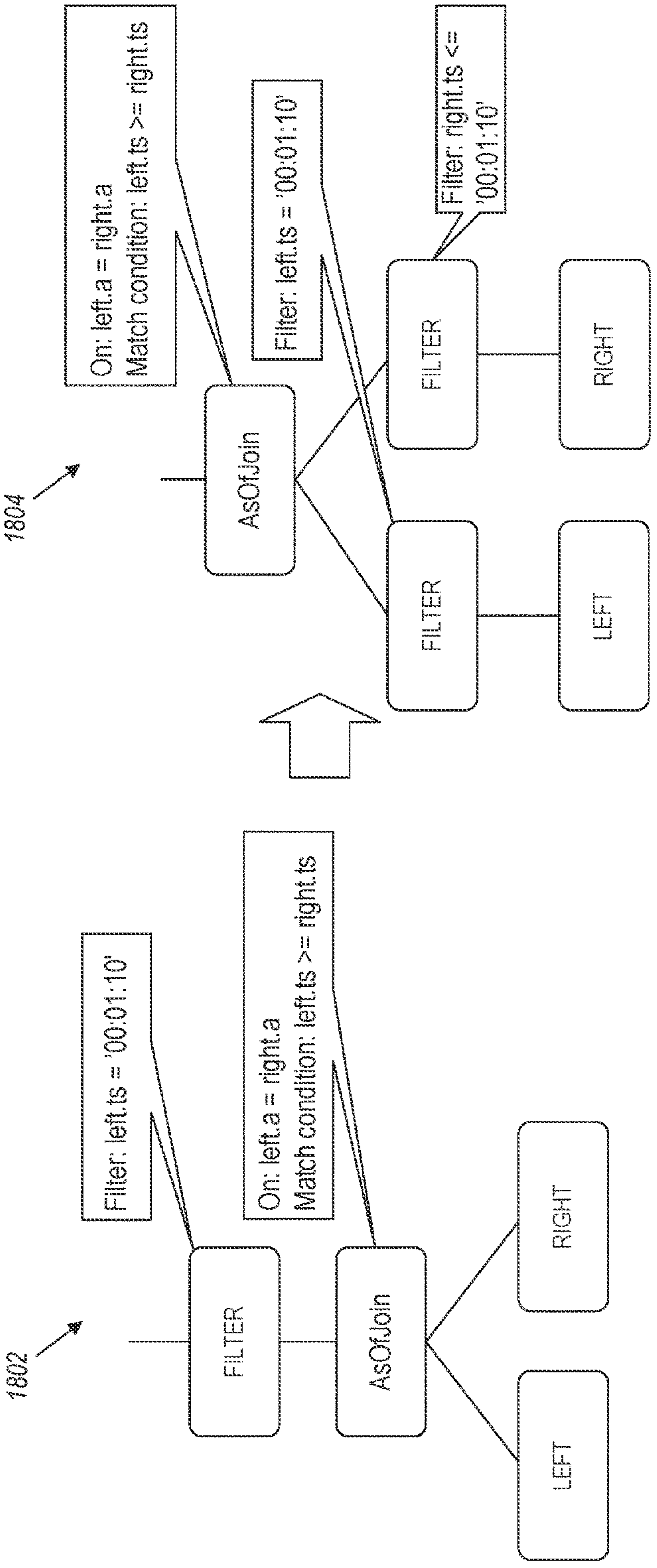

Referring to FIG. 18, QPM 128 can transform a query plan 1802 (including a filter on the left table using the match_condition clause) to query plan 1804 by performing a filter push-down on the AS OF JOIN operation by generating a transitive filter using the timestamp range condition of the match_condition clause.

Figure 19:
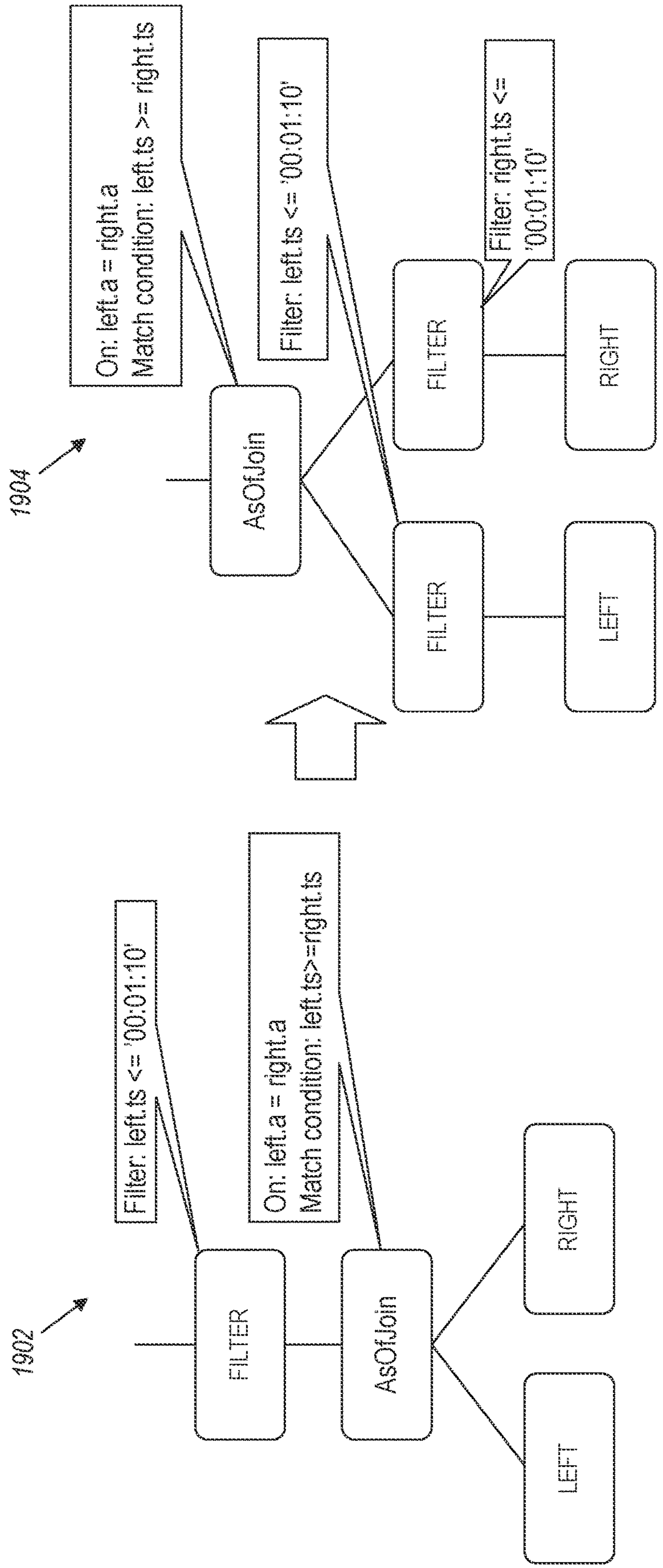

Referring to FIG. 19, QPM 128 can transform a query plan 1902 (including a filter on the left table using the match_condition clause) to query plan 1904 by performing a filter push-down on the AS OF JOIN operation by generating a transitive filter using the timestamp range condition of the match_condition clause.

Figure 20:
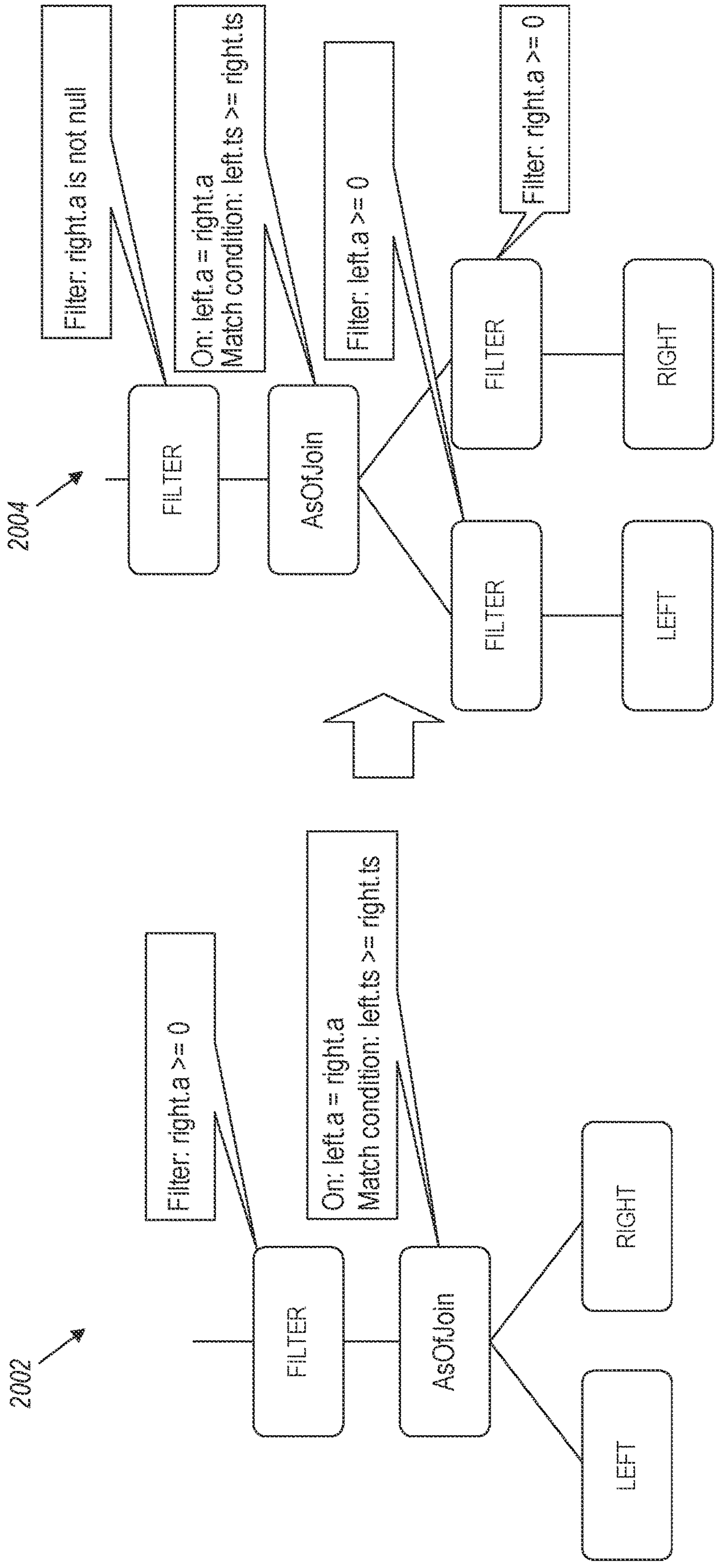

Referring to FIG. 20, QPM 128 can transform a query plan 2002 (including a filter on the right table to filter null values) to query plan 2004 by generating a pre-filter performed before the AS OF JOIN operation as well as a transitive filter using the join condition.

Figure 21:
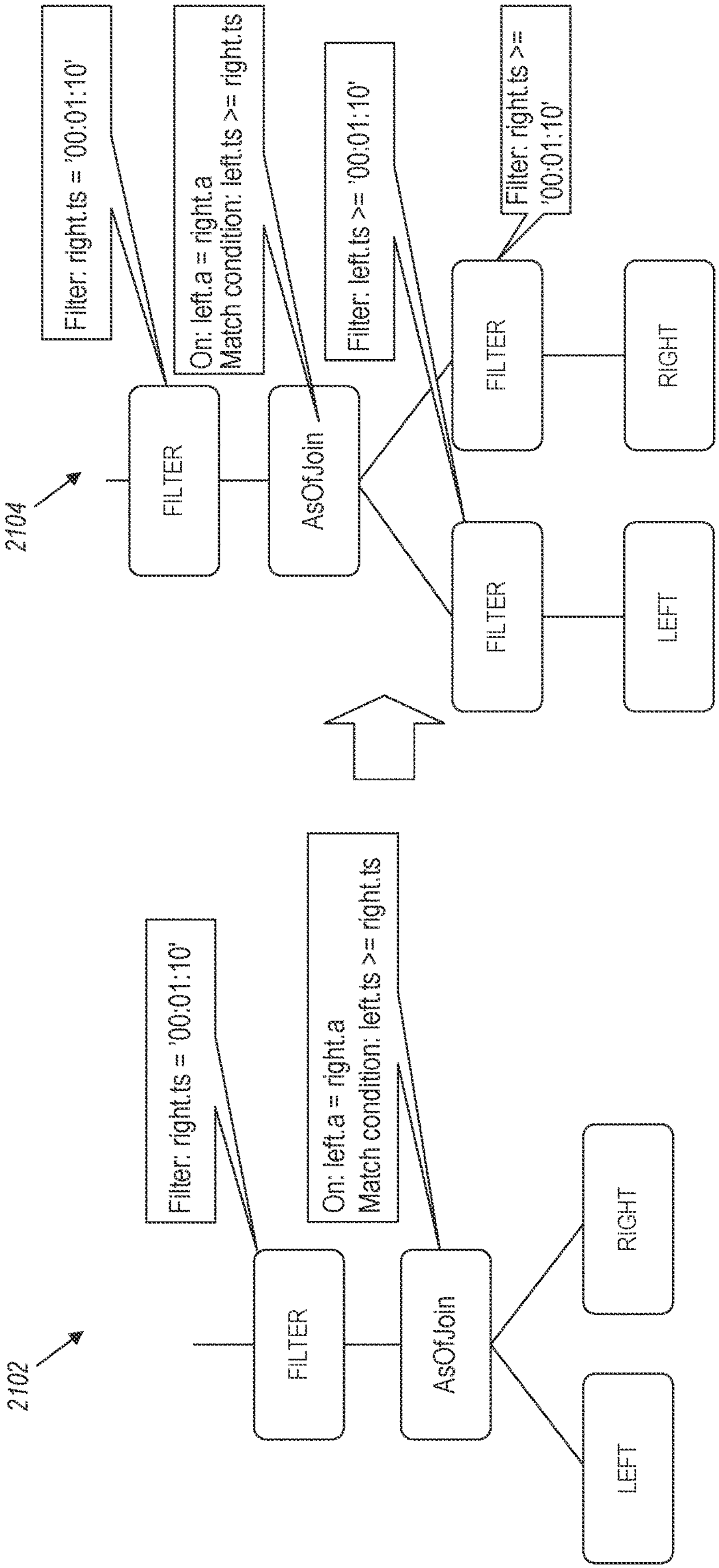

Referring to FIG. 21, QPM 128 can transform a query plan 2102 (including a filter on the right table to filter based on a timestamp) to query plan 2104 by generating a pre-filter performed before the AS OF JOIN operation as well as a transitive filter using the timestamp range condition (e.g., the match_condition clause).

Figure 22:
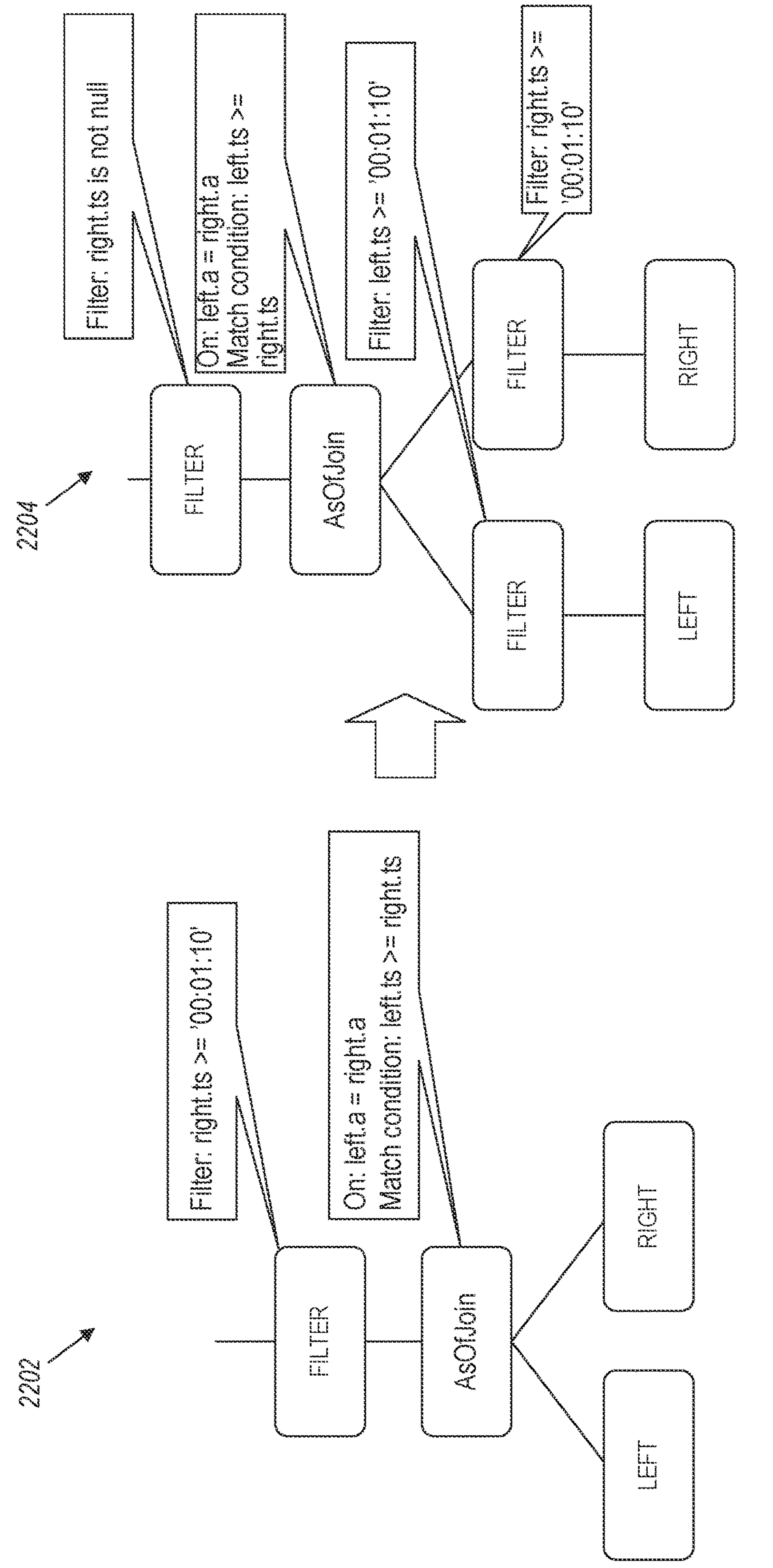

Referring to FIG. 22, QPM 128 can transform a query plan 2202 (including a filter on the right table to filter based on a timestamp) to query plan 2204 by generating a pre-filter performed before the AS OF JOIN operation as well as a transitive filter using the timestamp range condition (e.g., the match_condition clause).

Figure 23:
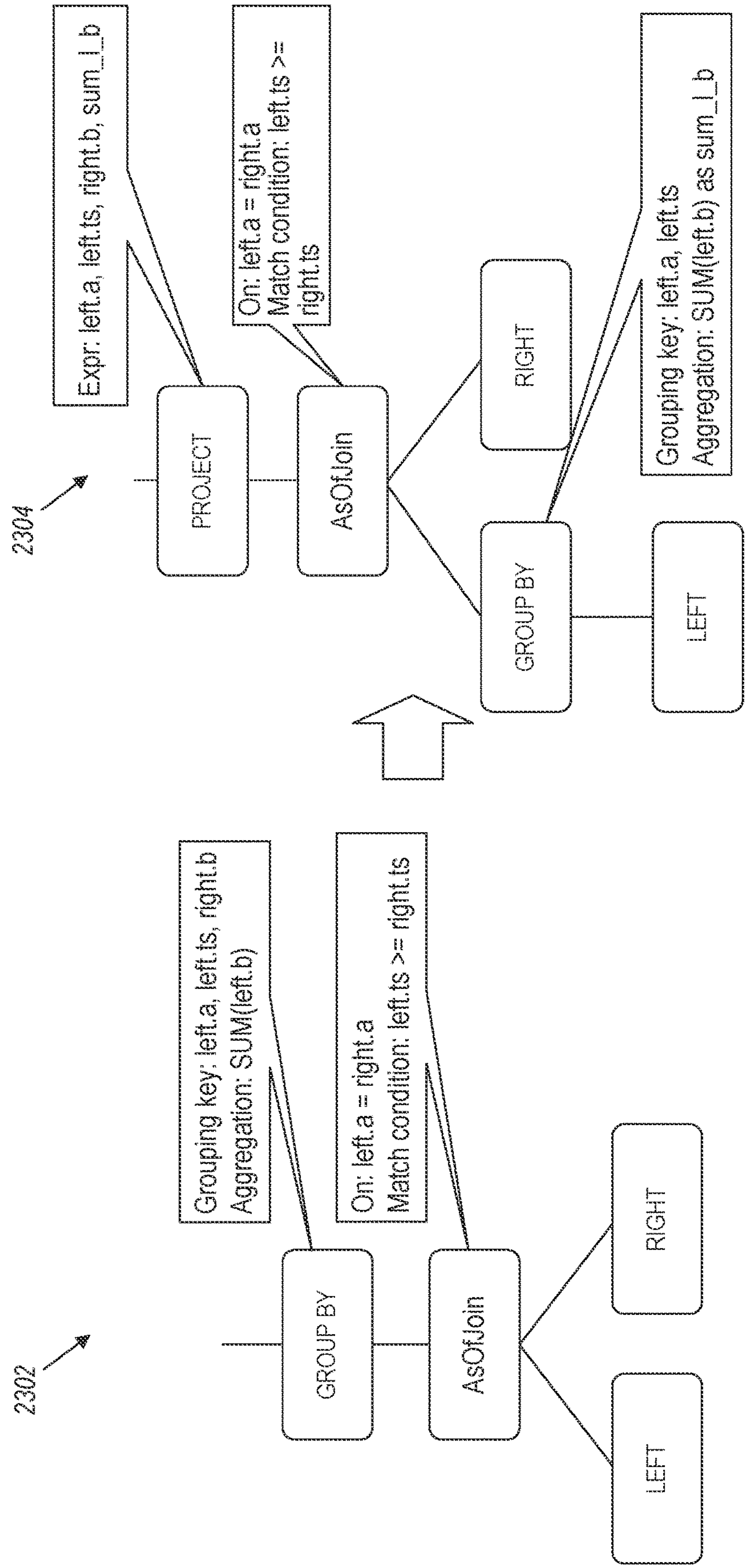

Referring to FIG. 23, QPM 128 can transform a query plan 2302 (including a GROUP BY operation before the AS OF JOIN operation) to query plan 2304 by performing a GROUP BY push-down applied to the left table.

Figure 24:
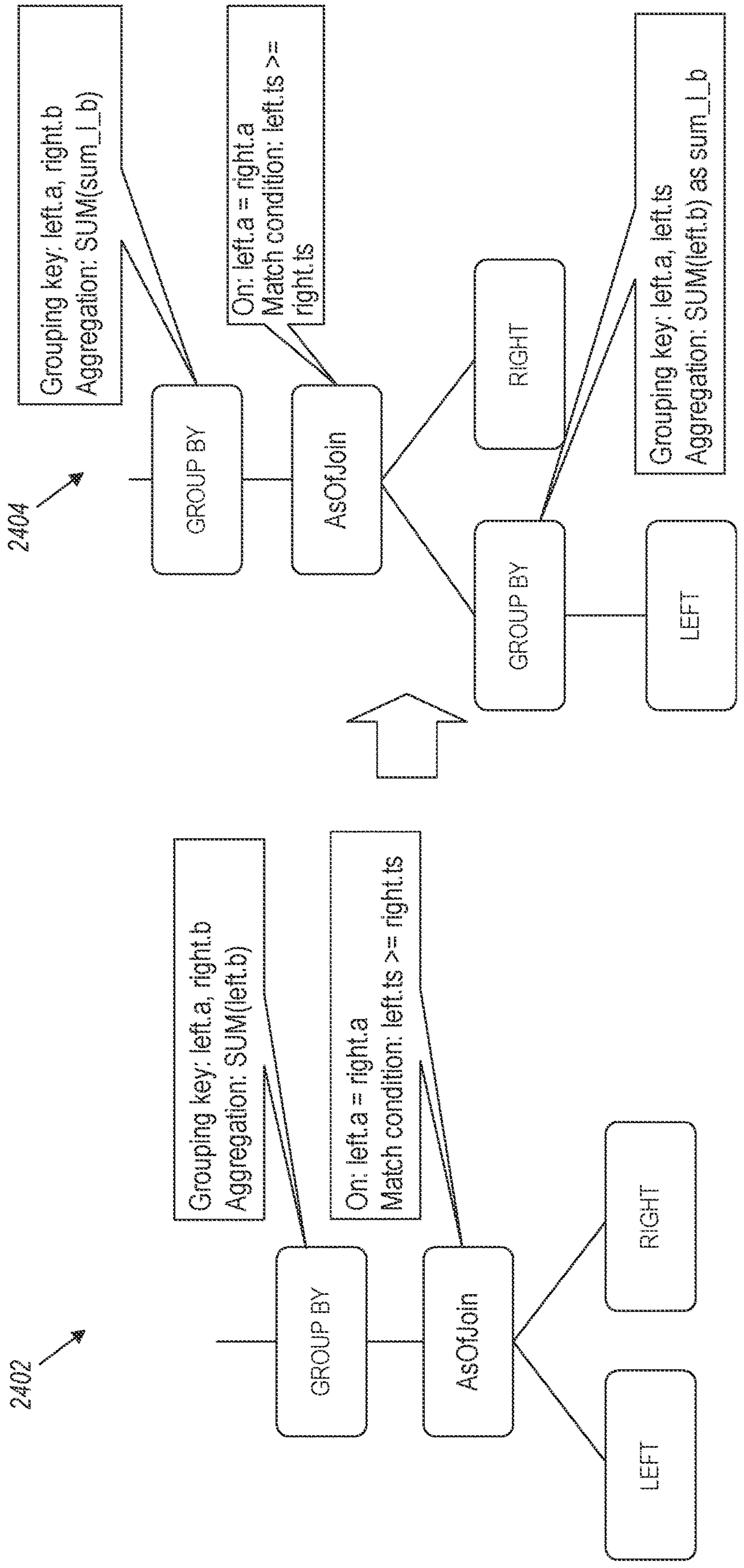

Referring to FIG. 24, QPM 128 can transform a query plan 2402 (including a GROUP BY operation before the AS OF JOIN operation) to query plan 2404 by performing a GROUP BY push-down applied to the left table (e.g., pre-aggregate or aggregation placement on the left table).

Figure 25:
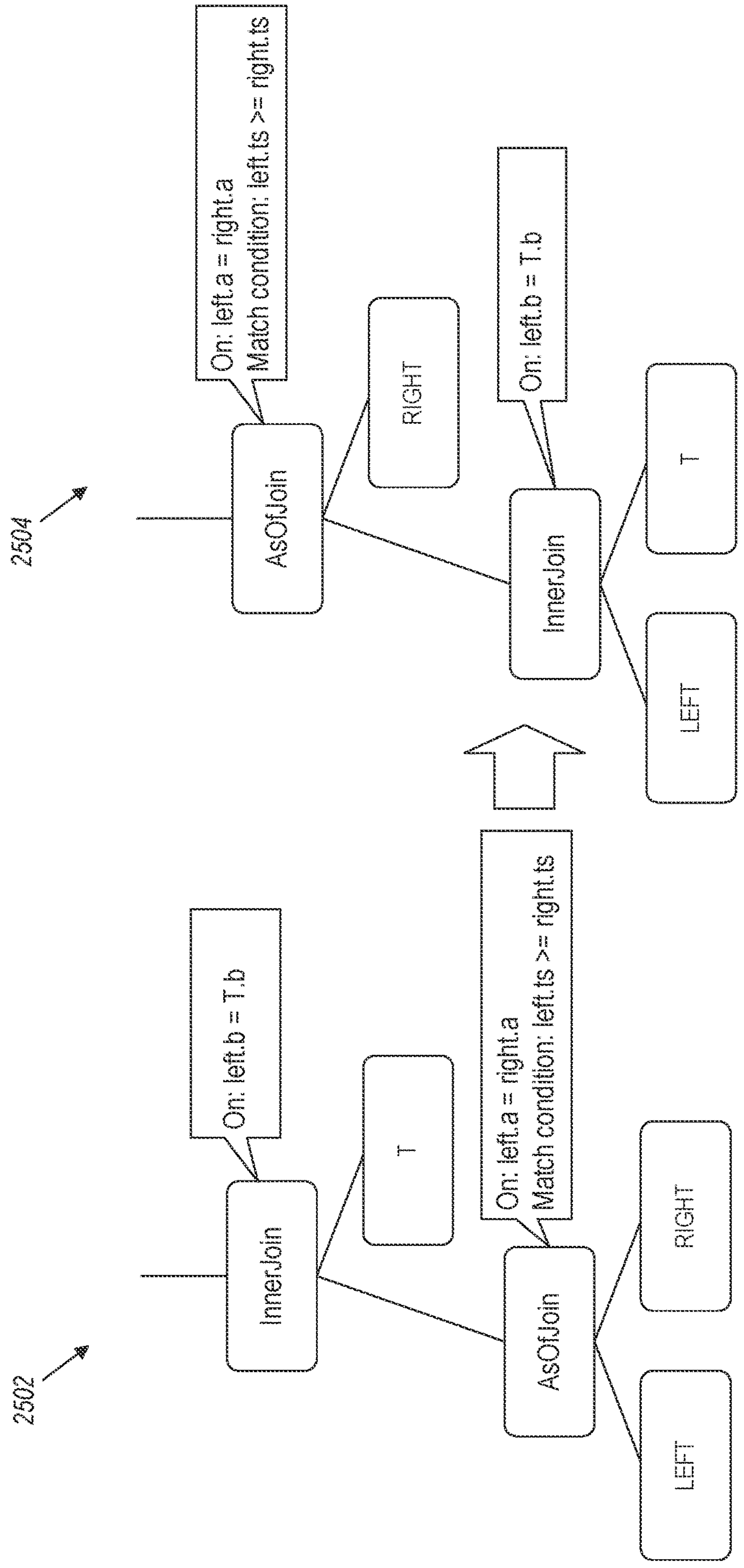

Referring to FIG. 25, QPM 128 can transform a query plan 2502 (including an INNER JOIN operation before the AS OF JOIN operation) to query plan 2504 by switching the INNER JOIN operation to be performed after the AS OF JOIN operation. Such switching can be performed if the first join (e.g., the INNER JOIN) is a size-reducing join operation.

Figure 26:
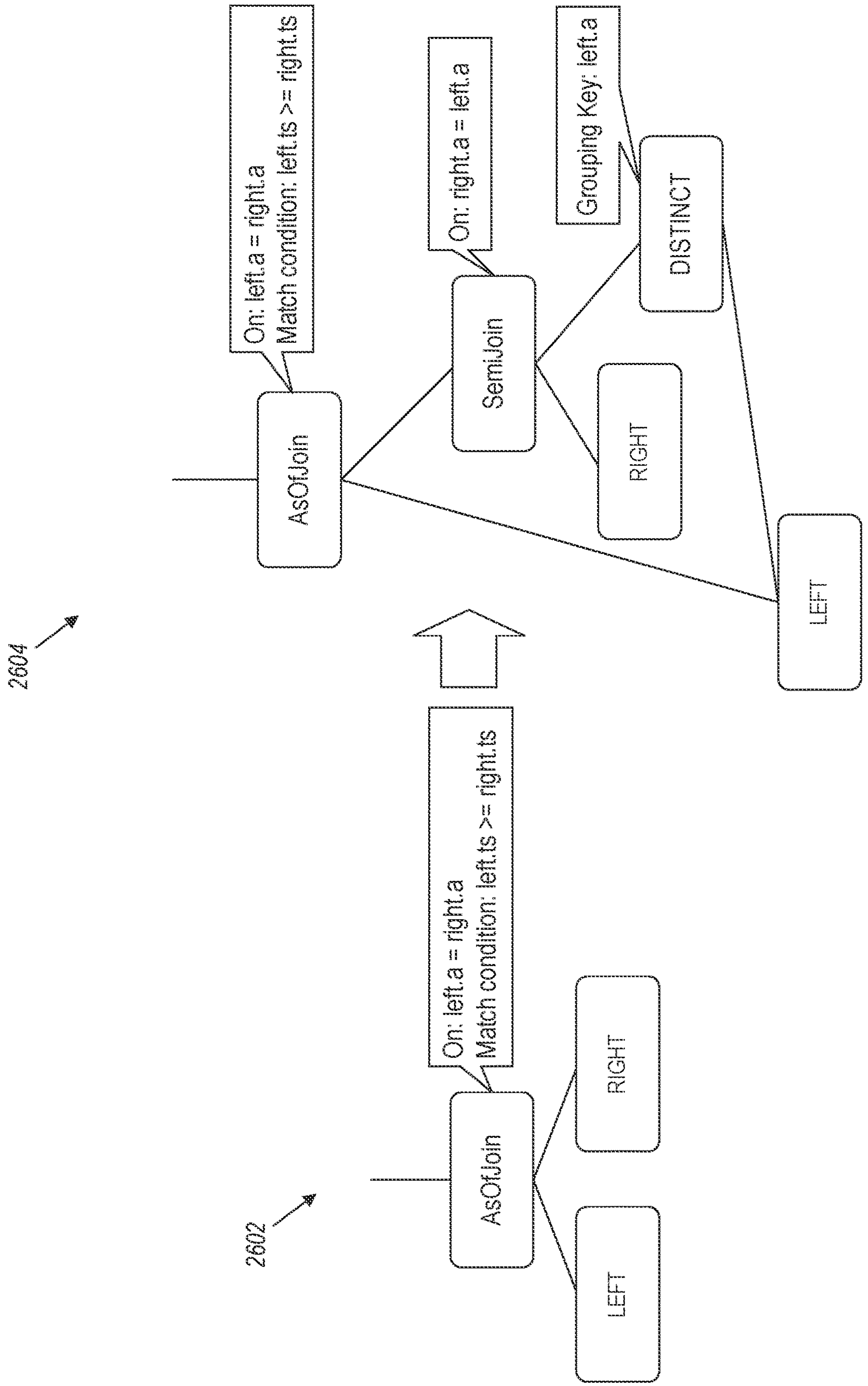

Referring to FIG. 26, QPM 128 can transform query plan 2602 to query plan 2604 by performing a semi-join reduction (e.g., to remove rows in the right table that do not have a corresponding entry in the left table). The DISTINCT operation in query plan 2604 has a grouping key for an entry in the left table.

Figure 27:
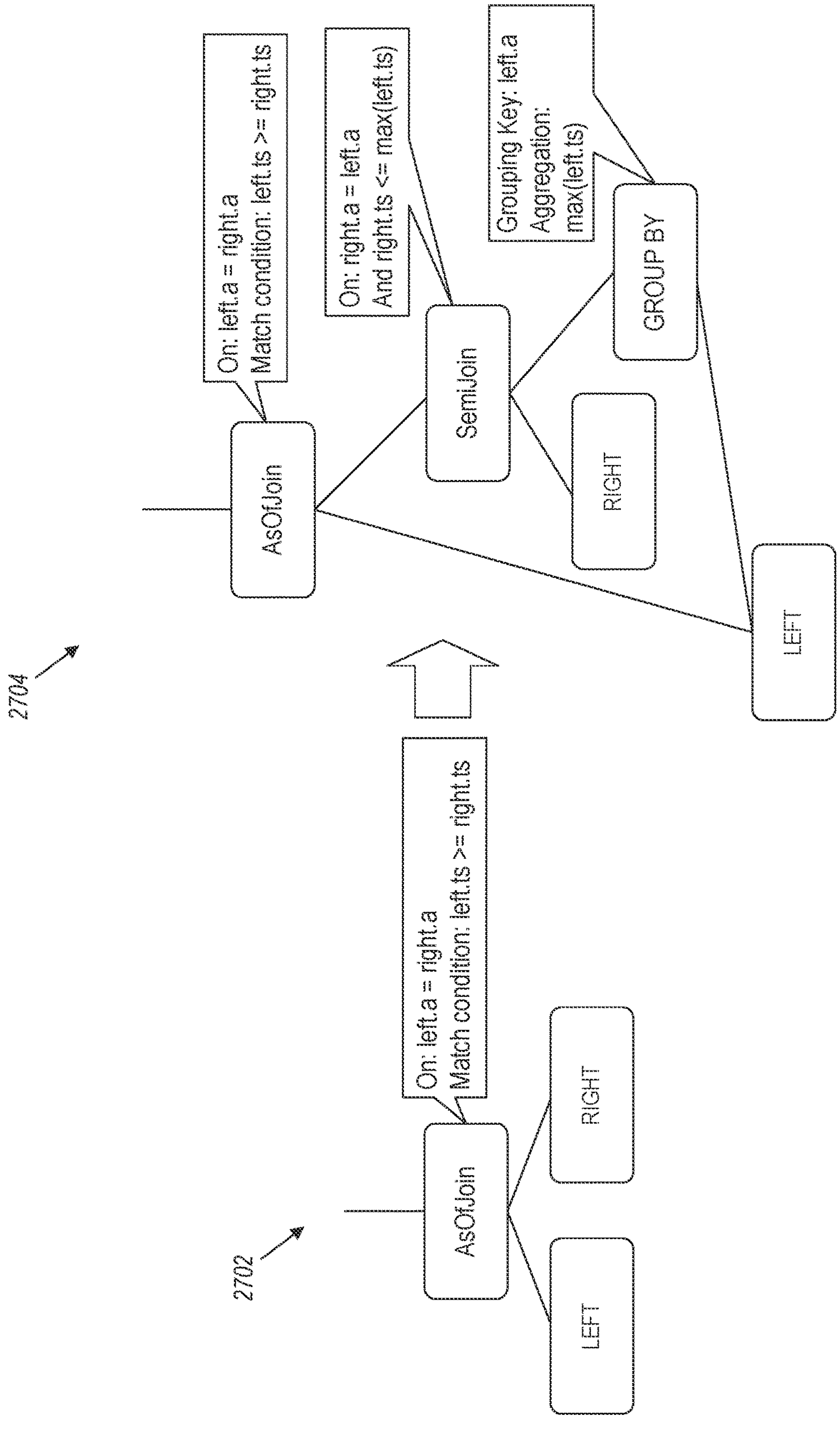

Referring to FIG. 27, QPM 128 can transform a query plan 2702 to query plan 2704 by performing a semi-join reduction using a timestamp range condition (e.g., use a GROUP BY operation to aggregate the maximum timestamp per each of the join keys and give it as a filter in the semi-join reduction). The SEMI JOIN operation is used to remove rows from the right table if those rows have a timestamp that will not match with the timestamps in the left table.

Figure 28:
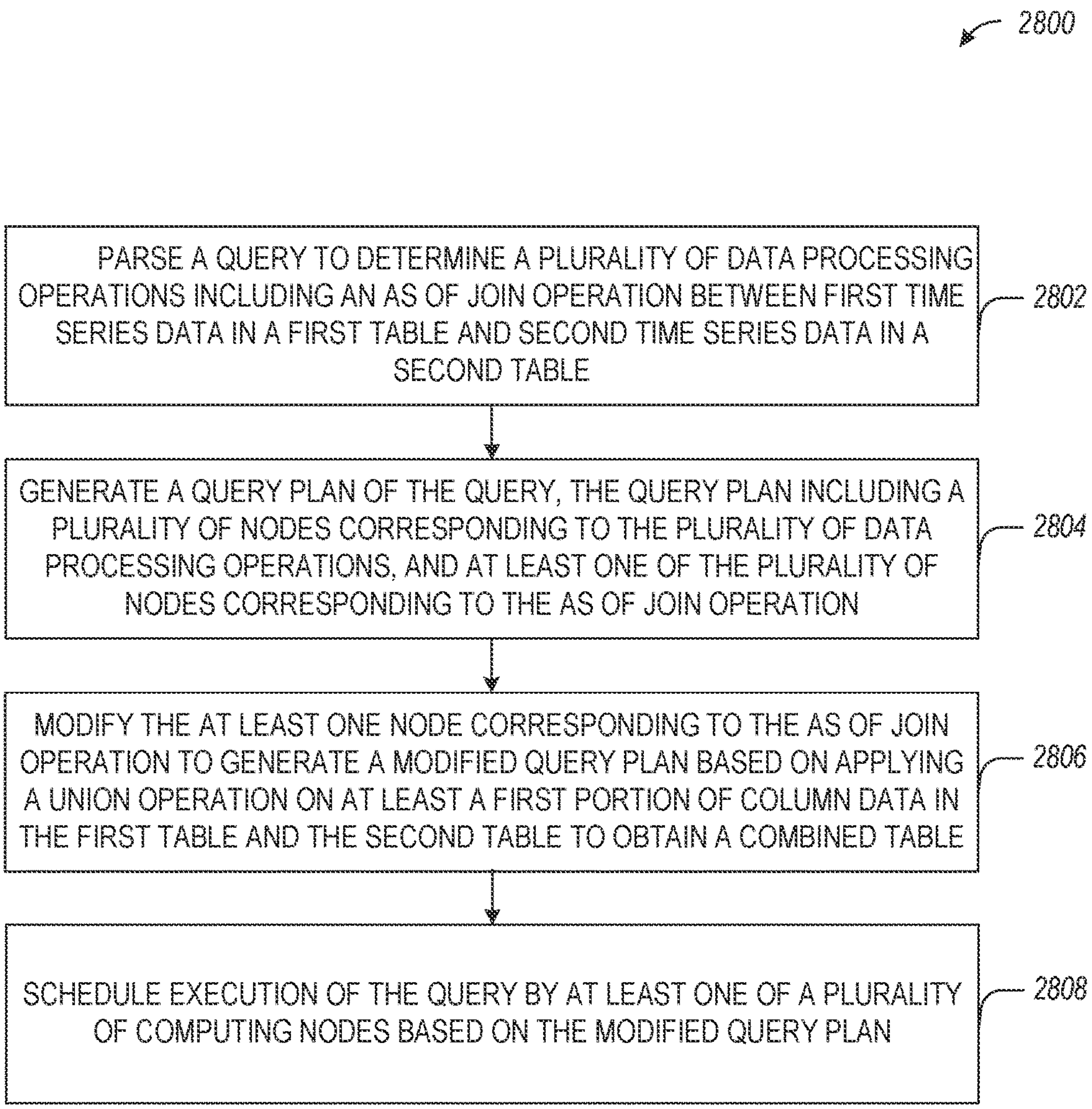
FIG. 28 is a flow diagram illustrating the operations of a database system in performing a method for processing a query including an AS OF JOIN operation, in accordance with some embodiments of the present disclosure.

FIG. 28 is a flow diagram illustrating the operations of a database system in performing a method 2800 for processing a query including an AS OF JOIN operation, in accordance with some embodiments of the present disclosure. Method 2800 may be embodied in computer-readable instructions for execution by one or more hardware components (e.g., one or more processors) such that the operations of method 2800 may be performed by components of network-based database system 102, such as components of the compute service manager 108 (e.g., the QPM 128) and/or the execution platform 110 (which components may be implemented as machine 2900 of FIG. 29). Accordingly, method 2800 is described below, by way of example with reference thereto. However, it shall be appreciated that method 2800 may be deployed on various other hardware configurations and is not intended to be limited to deployment within the network-based database system 102.

At operation 2802, a query is parsed (e.g., by QPM 128) to determine a plurality of data processing operations associated with the query. For example, QPM 128 parses a received query to determine the plurality of data processing operations of the query including an AS OF JOIN operation between first time series data in a first table (e.g., preserved table 702) and second time series data in a second table (e.g., reference table 704).

At operation 2804, a query plan of the query is generated. For example, QPM 128 generates query plan 902 including AS OF JOIN operation 908. The query plan includes a plurality of nodes corresponding to the plurality of data processing operations. At least one node of the plurality of nodes corresponds to the AS OF JOIN operation (e.g., the node including the AS OF JOIN operation 908 in FIG. 9).

At operation 2806, the at least one node corresponding to the AS OF JOIN operation is modified to generate a modified query plan of the query. For example, and as described in connection with FIG. 9-FIG. 14, query plan 902 is transformed/modified into modified query plan 904. The modifying is based at least partially on applying a UNION operation (e.g., UNION ALL operation 914) on at least a first portion of column data in the first table and the second table to obtain a combined table (e.g., combined table 1102 in FIG. 11).

Figure 10:
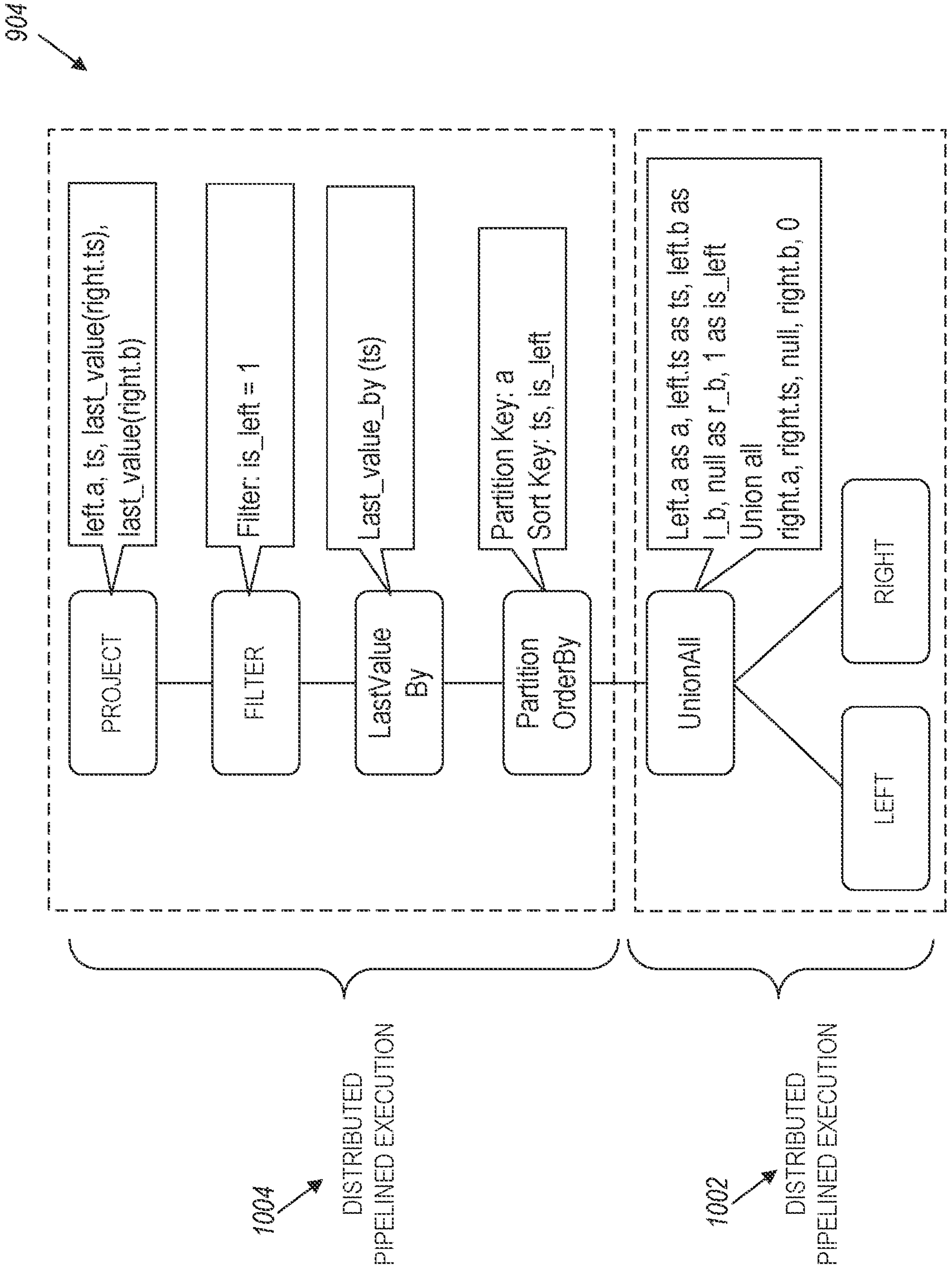

At operation 2808, execution of the query by at least one of a plurality of computing nodes is scheduled based on the modified query plan. More specifically, after the modified query plan 904 is generated (e.g., at least by transforming the AS OF JOIN operation as described in connection with FIG. 10-FIG. 14), QPM 128 performs distributed pipelined execution 1002 and 1004 of the modified query plan 904 (e.g., as illustrated in FIG. 10).

Figure 29:
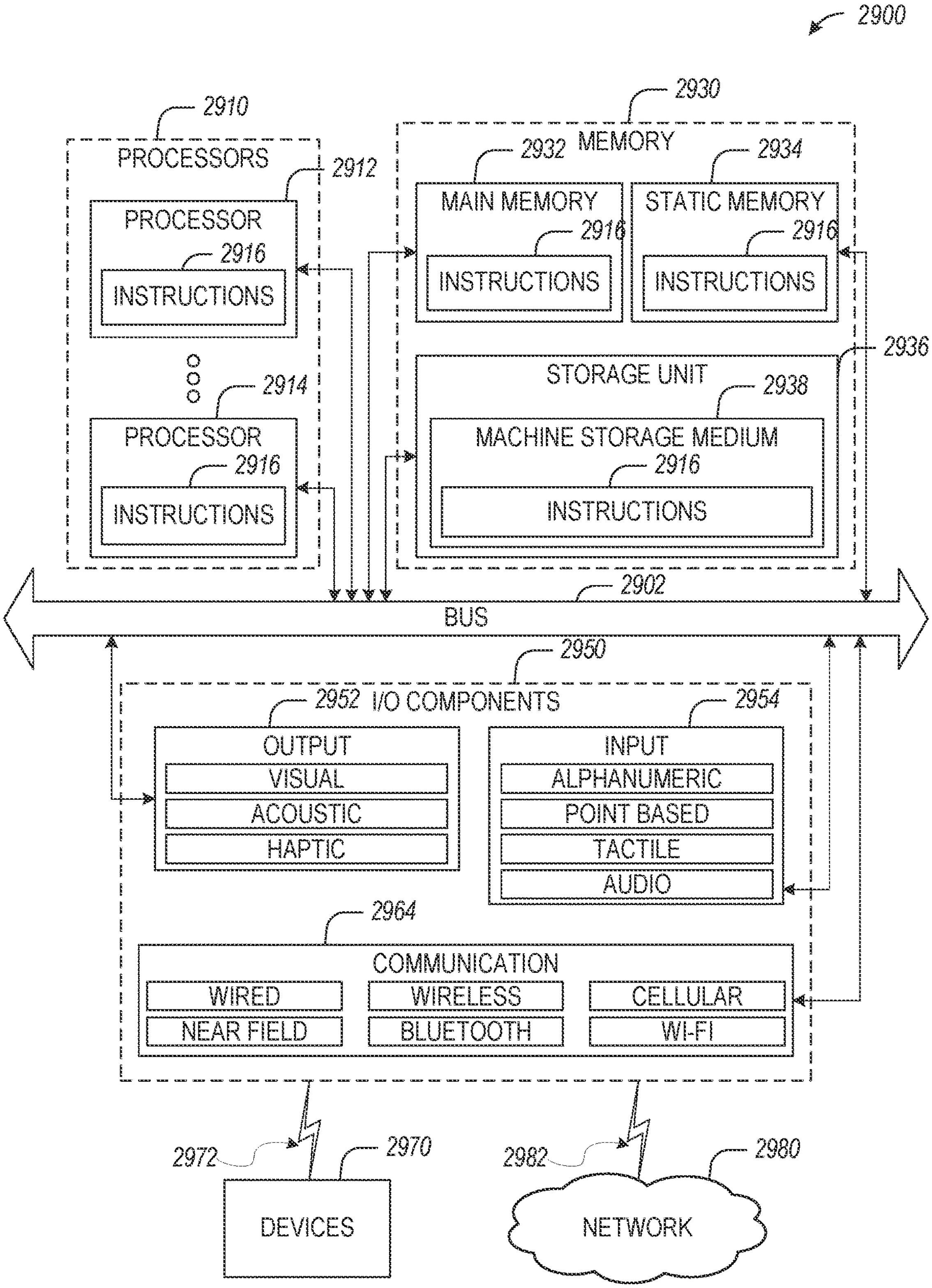
FIG. 29 illustrates a diagrammatic representation of a machine in the form of a computer system within which a set of instructions may be executed for causing the machine to perform any one or more of the methodologies discussed herein, in accordance with some embodiments of the present disclosure.

FIG. 29 illustrates a diagrammatic representation of machine 2900 in the form of a computer system within which a set of instructions may be executed for causing machine 2900 to perform any one or more of the methodologies discussed herein, according to an example embodiment. Specifically, FIG. 29 shows a diagrammatic representation of machine 2900 in the example form of a computer system, within which instructions 2916 (e.g., software, a program, an application, an applet, an app, or other executable code) for causing the machine 2900 to perform any one or more of the methodologies discussed herein may be executed. For example, instructions 2916 may cause machine 2900 to execute any one or more operations of method 2800 (or any other technique discussed herein, for example in connection with FIG. 4-FIG. 28). As another example, instructions 2916 may cause machine 2900 to implement one or more portions of the functionalities discussed herein. In this way, instructions 2916 may transform a general, non-programmed machine into a particular machine 2900 (e.g., the compute service manager 108 or a node in the execution platform 110) that is specially configured to carry out any one of the described and illustrated functions in the manner described herein. In yet another embodiment, instructions 2916 may configure the compute service manager 108 and/or a node in the execution platform 110 to carry out any one of the described and illustrated functions in the manner described herein.

In alternative embodiments, machine 2900 operates as a standalone device or may be coupled (e.g., networked) to other machines. In a networked deployment, the machine 2900 may operate in the capacity of a server machine or a client machine in a server-client network environment, or as a peer machine in a peer-to-peer (or distributed) network environment. Machine 2900 may comprise, but not be limited to, a server computer, a client computer, a personal computer (PC), a tablet computer, a laptop computer, a netbook, a smartphone, a mobile device, a network router, a network switch, a network bridge, or any machine capable of executing the instructions 2916, sequentially or otherwise, that specify actions to be taken by the machine 2900. Further, while only a single machine 2900 is illustrated, the term "machine" shall also be taken to include a collection of machines 2900 that individually or jointly execute the instructions 2916 to perform any one or more of the methodologies discussed herein.

Machine 2900 includes processors 2910, memory 2930, and input/output (I/O) components 2950 configured to communicate with each other such as via bus 2902. In some example embodiments, the processors 2910 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 2912 and a processor 2914 that may execute the instructions 2916. The term "processor" is intended to include multi-core processors 2910 that may comprise two or more independent processors (sometimes referred to as "cores") that may execute instructions 2916 contemporaneously. Although FIG. 29 shows multiple processors 2910, machine 2900 may include a single processor with a single core, a single processor with multiple cores (e.g., a multi-core processor), multiple processors with a single core, multiple processors with multiple cores, or any combination thereof.

The memory 2930 may include a main memory 2932, a static memory 2934, and a storage unit 2936, all accessible to the processors 2910 such as via the bus 2902. The main memory 2932, the static memory 2934, and the storage unit 2936 store the instructions 2916 embodying any one or more of the methodologies or functions described herein. The instructions 2916 may also reside, completely or partially, within the main memory 2932, within the static memory 2934, within machine storage medium 2938 of the storage unit 2936, within at least one of the processors 2910 (e.g., within the processor's cache memory), or any suitable combination thereof, during execution thereof by the machine 2900.

The I/O components 2950 include components to receive input, provide output, produce output, transmit information, exchange information, capture measurements, and so on. The specific I/O components 2950 that are included in a particular machine 2900 will depend on the type of machine. For example, portable machines such as mobile phones will likely include a touch input device or other such input mechanisms, while a headless server machine will likely not include such a touch input device. It will be appreciated that the I/O components 2950 may include many other components that are not shown in FIG. 29. The I/O components 2950 are grouped according to functionality merely for simplifying the following discussion and the grouping is in no way limiting. In various example embodiments, the I/O components 2950 may include output components 2952 and input components 2954. The output components 2952 may include visual components (e.g., a display such as a plasma display panel (PDP), a light-emitting diode (LED) display, a liquid crystal display (LCD), a projector, or a cathode ray tube (CRT)), acoustic components (e.g., speakers), other signal generators, and so forth. The input components 2954 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures or other tactile input components), audio input components (e.g., a microphone), and the like.

Communication may be implemented using a wide variety of technologies. The I/O components 2950 may include communication components 2964 operable to couple the machine 2900 to a network 2980 or devices 2970 via a coupling 2982 and a coupling 2972, respectively. For example, communication components 2964 may include a network interface component or another suitable device to interface with network 2980. In further examples, communication components 2964 may include wired communication components, wireless communication components, cellular communication components, and other communication components to provide communication via other modalities. The device 2970 may be another machine or any of a wide variety of peripheral devices (e.g., a peripheral device coupled via a universal serial bus (USB)). For example, as noted above, machine 2900 may correspond to any one of the compute service manager 108 or the execution platform 110, and device 2970 may include the client device 114 or any other computing device described herein as being in communication with the network-based database system 102 or the storage platform 104.

The various memories (e.g., 2930, 2932, 2934, and/or memory of the processor(s) 2910 and/or the storage unit 2936) may store one or more sets of instructions 2916 and data structures (e.g., software) embodying or utilized by any one or more of the methodologies or functions described herein. These instructions 2916, when executed by the processor(s) 2910, cause various operations to implement the disclosed embodiments.

As used herein, the terms "machine-storage medium," "device-storage medium," and "computer-storage medium" mean the same thing and may be used interchangeably in this disclosure. The terms refer to single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 2980 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, network 2980 or a portion of network 2980 may include a wireless or cellular network and coupling 2982 may be a Code Division Multiple Access (CDMA) connection, a Global System for Mobile Communications (GSM) connection, or another type of cellular or wireless coupling. In this example, the coupling 2982 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth-generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 2916 may be transmitted or received over network 2980 using a transmission medium via a network interface device (e.g., a network interface component included in the communication components 2964) and utilizing any one of several well-known transfer protocols (e.g., hypertext transfer protocol (HTTP)). Similarly, instructions 2916 may be transmitted or received using a transmission medium via coupling 2972 (e.g., a peer-to-peer coupling) to device 2970. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 2916 for execution by the machine 2900, and include digital or analog communications signals or other intangible media to facilitate communication of such software. Hence, the terms "transmission medium" and "signal medium" shall be taken to include any form of a modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The various operations of example methods described herein may be performed, at least partially, by one or more processors that are temporarily configured (e.g., by software) or permanently configured to perform the relevant operations. Similarly, the methods described herein may be at least partially processor-implemented. For example, at least some of the operations of the disclosed methods may be performed by one or more processors. The performance of certain operations may be distributed among the one or more processors, not only residing within a single machine but also deployed across several machines. In some example embodiments, the processor or processors may be located in a single location (e.g., within a home environment, an office environment, or a server farm), while in other embodiments the processors may be distributed across several locations.

Described implementations of the subject matter can include one or more features, alone or in combination as illustrated below by way of examples.

Example 1 is a method comprising: parsing, by at least one hardware processor, a query to determine a plurality of data processing operations associated with the query, the plurality of data processing operations comprising an AS OF JOIN operation between first time series data in a first table and second time series data in a second table; generating a query plan of the query, the query plan including a plurality of nodes corresponding to the plurality of data processing operations, and at least one node of the plurality of nodes corresponding to the AS OF JOIN operation; modifying the at least one node corresponding to the AS OF JOIN operation to generate a modified query plan of the query, the modifying based on applying a UNION operation on at least a first portion of column data in the first table and the second table to obtain a combined table, and scheduling execution of the query by at least one of a plurality of computing nodes based on the modified query plan.

In Example 2, the subject matter of Example 1 includes, wherein the at least a first portion of column data is associated with at least one data type that is common between the first table and the second table.

In Example 3, the subject matter of Examples 1-2 includes, wherein the at least a first portion of column data comprises first timestamp data associated with the first time series data and second timestamp data associated with the second time series data, and wherein the modifying further comprises: applying the UNION operation on the first timestamp data and the second timestamp data.

In Example 4, the subject matter of Example 3 includes, applying null padding to at least a second portion of column data in the first table and the second table, the at least a second portion comprising data originating from one of the first table or the second table.

In Example 5, the subject matter of Example 4 includes, adding a first new column to the combined table to generate a modified combined table, the first new column including indicator data to indicate whether a corresponding row of the modified combined table includes data originating from the first table or the second table.

In Example 6, the subject matter of Example 5 includes, applying a partitioning operation to the modified combined table using a partition key, the partition key based on a data type that is common between the first table and the second table.

In Example 7, the subject matter of Example 6 includes, sorting rows within the modified combined table to generate a sorted table, the sorting based on completion of the partitioning operation and using a sorting key, the sorting key based on the first timestamp data and the second timestamp data.

In Example 8, the subject matter of Example 7 includes, adding at least a second new column to the sorted table to generate a modified sorted table, the at least a second new column comprising the at least a second portion of column data in the first table and the second table without the null padding.

In Example 9, the subject matter of Example 8 includes, applying a filtering operation and a project operation to the modified sorted table to generate a result table of the AS OF JOIN operation, the filtering operation based on the indicator data.

In Example 10, the subject matter of Examples 1-9 includes, scheduling execution of the UNION operation on a first computing node of the plurality of computing nodes; and scheduling execution of one or more remaining operations of the modified query plan on at least a second computing node of the plurality of computing nodes.

Example 11 is a system comprising: at least one hardware processor; and at least one memory storing instructions that cause the at least one hardware processor to perform operations comprising: parsing a query to determine a plurality of data processing operations associated with the query, the plurality of data processing operations comprising an AS OF JOIN operation between first time series data in a first table and second time series data in a second table; generating a query plan of the query, the query plan including a plurality of nodes corresponding to the plurality of data processing operations, and at least one node of the plurality of nodes corresponding to the AS OF JOIN operation; modifying the at least one node corresponding to the AS OF JOIN operation to generate a modified query plan of the query, the modifying based on applying a UNION operation on at least a first portion of column data in the first table and the second table to obtain a combined table; and scheduling execution of the query by at least one of a plurality of computing nodes based on the modified query plan.

In Example 12, the subject matter of Example 11 includes, wherein the at least a first portion of column data is associated with at least one data type that is common between the first table and the second table.

In Example 13, the subject matter of Examples 11-12 includes, wherein the at least a first portion of column data comprises first timestamp data associated with the first time series data and second timestamp data associated with the second time series data, and wherein the operations for the modifying further comprise: applying the UNION operation on the first timestamp data and the second timestamp data.

In Example 14, the subject matter of Example 13 includes, the operations further comprising: applying null padding to at least a second portion of column data in the first table and the second table, the at least a second portion comprising data originating from one of the first table or the second table.

In Example 15, the subject matter of Example 14 includes, the operations further comprising: adding a first new column to the combined table to generate a modified combined table, the first new column including indicator data to indicate whether a corresponding row of the modified combined table includes data originating from the first table or the second table.

In Example 16, the subject matter of Example 15 includes, the operations further comprising: applying a partitioning operation to the modified combined table using a partition key, the partition key based on a data type that is common between the first table and the second table.

In Example 17, the subject matter of Example 16 includes, the operations further comprising: sorting rows within the modified combined table to generate a sorted table, the sorting based on completion of the partitioning operation and using a sorting key, the sorting key based on the first timestamp data and the second timestamp data.

In Example 18, the subject matter of Example 17 includes, the operations further comprising: adding at least a second new column to the sorted table to generate a modified sorted table, the at least a second new column comprising the at least a second portion of column data in the first table and the second table without the null padding.

In Example 19, the subject matter of Example 18 includes, the operations further comprising: applying a filtering operation and a project operation to the modified sorted table to generate a result table of the AS OF JOIN operation, the filtering operation based on the indicator data.

In Example 20, the subject matter of Examples 11-19 includes, the operations further comprising: scheduling execution of the UNION operation on a first computing node of the plurality of computing nodes; and scheduling execution of one or more remaining operations of the modified query plan on at least a second computing node of the plurality of computing nodes.

Example 21 is a computer-storage medium comprising instructions that, when executed by one or more processors of a machine, configure the machine to perform operations comprising: parsing a query to determine a plurality of data processing operations associated with the query, the plurality of data processing operations comprising an AS OF JOIN operation between first time series data in a first table and second time series data in a second table; generating a query plan of the query, the query plan including a plurality of nodes corresponding to the plurality of data processing operations, and at least one node of the plurality of nodes corresponding to the AS OF JOIN operation; modifying the at least one node corresponding to the AS OF JOIN operation to generate a modified query plan of the query, the modifying based on applying a UNION operation on at least a first portion of column data in the first table and the second table to obtain a combined table; and scheduling execution of the query by at least one of a plurality of computing nodes based on the modified query plan.

In Example 22, the subject matter of Example 21 includes, wherein the at least a first portion of column data is associated with at least one data type that is common between the first table and the second table.

In Example 23, the subject matter of Examples 21-22 includes, wherein the at least a first portion of column data comprises first timestamp data associated with the first time series data and second timestamp data associated with the second time series data, and wherein the operations for the modifying further comprise: applying the UNION operation on the first timestamp data and the second timestamp data.

In Example 24, the subject matter of Example 23 includes, the operations further comprising: applying null padding to at least a second portion of column data in the first table and the second table, the at least a second portion comprising data originating from one of the first table or the second table.

In Example 25, the subject matter of Example 24 includes, the operations further comprising: adding a first new column to the combined table to generate a modified combined table, the first new column including indicator data to indicate whether a corresponding row of the modified combined table includes data originating from the first table or the second table.

In Example 26, the subject matter of Example 25 includes, the operations further comprising: applying a partitioning operation to the modified combined table using a partition key, the partition key based on a data type that is common between the first table and the second table.

In Example 27, the subject matter of Example 26 includes, the operations further comprising: sorting rows within the modified combined table to generate a sorted table, the sorting based on completion of the partitioning operation and using a sorting key, the sorting key based on the first timestamp data and the second timestamp data.

In Example 28, the subject matter of Example 27 includes, the operations further comprising: adding at least a second new column to the sorted table to generate a modified sorted table, the at least a second new column comprising the at least a second portion of column data in the first table and the second table without the null padding.

In Example 29, the subject matter of Example 28 includes, the operations further comprising: applying a filtering operation and a project operation to the modified sorted table to generate a result table of the AS OF JOIN operation, the filtering operation based on the indicator data.

In Example 30, the subject matter of Examples 21-29 includes, the operations further comprising: scheduling execution of the UNION operation on a first computing node of the plurality of computing nodes; and scheduling execution of one or more remaining operations of the modified query plan on at least a second computing node of the plurality of computing nodes.

Example 31 is at least one machine-readable medium including instructions that, when executed by processing circuitry, cause the processing circuitry to perform operations to implement any of Examples 1-30.

Example 32 is an apparatus comprising means to implement any of Examples 1-30.

Example 33 is a system to implement any of Examples 1-30.

Example 34 is a method to implement any of Examples 1-30.

Although the embodiments of the present disclosure have been described concerning specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is disclosed. Thus, although specific embodiments have been illustrated and described herein, it should be appreciated that any arrangement calculated to achieve the same purpose may be substituted for the specific embodiments shown. This disclosure is intended to cover any adaptations or variations of various embodiments. Combinations of the above embodiments, and other embodiments not specifically described herein, will be apparent to those of skill in the art, upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

What is claimed is:

1. A method comprising:

generating, by at least one hardware processor, a query plan of a query, the query including a JOIN operation between first time series data and second time series data, the JOIN operation matching rows of the first time series data with rows of the second time series data based on inexact timestamp ranges;

modifying at least one node in the query plan corresponding to the JOIN operation to generate a modified query plan, the modifying based on replacing the at least one node with a new node including a UNION operation, the UNION operation based on the first time series data and the second time series data; and scheduling execution of the query based on the modified query plan.

2. The method of claim 1, wherein the JOIN operation is an AS OF JOIN operation, and the method further comprising:

applying the UNION operation on at least a first portion of column data in the first time series data and the second time series data, the at least a first portion of column data being associated with at least one data type that is common between the first time series data and the second time series data.

3. The method of claim 2, wherein the at least a first portion of column data comprises first timestamp data associated with the first time series data and second timestamp data associated with the second time series data, and wherein the modifying further comprises:

applying the UNION operation on the first timestamp data and the second timestamp data.

4. The method of claim 3, further comprising:

applying null padding to at least a second portion of column data in the first time series data and the second time series data.

5. The method of claim 4, further comprising:

adding a first new column to a combined table with the first time series data and the second time series data to generate a modified combined table, the first new column including indicator data to indicate whether a corresponding row of the modified combined table includes data originating from the first time series data or the second time series data.

6. The method of claim 5, further comprising:

applying a partitioning operation to the modified combined table using a partition key, the partition key based on a data type that is common between the first time series data and the second time series data.

7. The method of claim 6, further comprising:

sorting rows within the modified combined table to generate a sorted table, the sorting based on completion of the partitioning operation and using a sorting key, and the sorting key based on the first timestamp data and the second timestamp data.

8. The method of claim 7, further comprising:

adding at least a second new column to the sorted table to generate a modified sorted table, the at least a second new column comprising the at least a second portion of column data in the first time series data, and the second time series data without the null padding.

9. The method of claim 8, further comprising:

applying a filtering operation and a project operation to the modified sorted table to generate a result table of the JOIN operation, the filtering operation based on the indicator data.

10. The method of claim 1, further comprising:

scheduling execution of the UNION operation on a first computing node of a plurality of computing nodes of a database system; and scheduling execution of one or more remaining operations of the modified query plan on at least a second computing node of the plurality of computing nodes.

11. A system comprising:
at least one hardware processor; and
at least one memory storing instructions that cause the at least one hardware processor to perform operations comprising:
generating a query plan of a query, the query including a JOIN operation between first time series data and second time series data, the JOIN operation matching rows of the first time series data with rows of the second time series data based on inexact timestamp ranges;
modifying at least one node in the query plan corresponding to the JOIN operation to generate a modified query plan, the modifying based on replacing the at least one node with a new node including a UNION operation, the UNION operation based on the first time series data and the second time series data; and
scheduling execution of the query based on the modified query plan.

12. The system of claim 11, wherein the JOIN operation is an AS OF JOIN operation, and the operations further comprising:
applying the UNION operation on at least a first portion of column data in the first time series data and the second time series data, the at least a first portion of column data being associated with at least one data type that is common between the first time series data and the second time series data.

13. The system of claim 12, wherein the at least a first portion of column data comprises first timestamp data associated with the first time series data and second timestamp data associated with the second time series data, and wherein the modifying further comprises:
applying the UNION operation on the first timestamp data and the second timestamp data.

14. The system of claim 13, the operations further comprising:
applying null padding to at least a second portion of column data in the first time series data and the second time series data.

15. The system of claim 14, the operations further comprising:
adding a first new column to a combined table with the first time series data and the second time series data to generate a modified combined table, the first new column including indicator data to indicate whether a corresponding row of the modified combined table includes data originating from the first time series data or the second time series data.

16. The system of claim 15, the operations further comprising:
applying a partitioning operation to the modified combined table using a partition key, the partition key based on a data type that is common between the first time series data and the second time series data.

17. The system of claim 16, the operations further comprising:
sorting rows within the modified combined table to generate a sorted table, the sorting based on completion of the partitioning operation and using a sorting key, and the sorting key based on the first timestamp data and the second timestamp data.

18. The system of claim 17, the operations further comprising:
adding at least a second new column to the sorted table to generate a modified sorted table, the at least a second new column comprising the at least a second portion of column data in the first time series data, and the second time series data without the null padding.

19. The system of claim 18, the operations further comprising:
applying a filtering operation and a project operation to the modified sorted table to generate a result table of the JOIN operation, the filtering operation based on the indicator data.

20. The system of claim 11, the operations further comprising:
scheduling execution of the UNION operation on a first computing node of a plurality of computing nodes of a database system; and
scheduling execution of one or more remaining operations of the modified query plan on at least a second computing node of the plurality of computing nodes.

21. A computer-storage medium comprising instructions that, when executed by one or more processors of a machine, configure the machine to perform operations comprising:
generating a query plan of a query, the query including a JOIN operation between first time series data and second time series data, the JOIN operation matching rows of the first time series data with rows of the second time series data based on inexact timestamp ranges;
modifying at least one node in the query plan corresponding to the JOIN operation to generate a modified query plan, the modifying based on replacing the at least one node with a new node including a UNION operation, the UNION operation based on the first time series data and the second time series data; and
scheduling execution of the query based on the modified query plan.

22. The computer-storage medium of claim 21, wherein the JOIN operation is an AS OF JOIN operation, and the operations further comprising:
applying the UNION operation on at least a first portion of column data in the first time series data and the second time series data, the at least a first portion of column data being associated with at least one data type that is common between the first time series data and the second time series data.

23. The computer-storage medium of claim 22, wherein the at least a first portion of column data comprises first timestamp data associated with the first time series data and second timestamp data associated with the second time series data, and wherein the modifying further comprises:
applying the UNION operation on the first timestamp data and the second timestamp data.

24. The computer-storage medium of claim 23, the operations further comprising:
applying null padding to at least a second portion of column data in the first time series data and the second time series data.

25. The computer-storage medium of claim 24, the operations further comprising:
adding a first new column to a combined table with the first time series data and the second time series data to generate a modified combined table, the first new column including indicator data to indicate whether a corresponding row of the modified combined table includes data originating from the first time series data or the second time series data.

26. The computer-storage medium of claim 25, the operations further comprising:

applying a partitioning operation to the modified combined table using a partition key, the partition key based on a data type that is common between the first time series data and the second time series data.

27. The computer-storage medium of claim 26, the operations further comprising:

sorting rows within the modified combined table to generate a sorted table, the sorting based on completion of the partitioning operation and using a sorting key, and the sorting key based on the first timestamp data and the second timestamp data.

28. The computer-storage medium of claim 27, the operations further comprising:

adding at least a second new column to the sorted table to generate a modified sorted table, the at least a second new column comprising the at least a second portion of column data in the first time series data, and the second time series data without the null padding.

29. The computer-storage medium of claim 28, the operations further comprising:

applying a filtering operation and a project operation to the modified sorted table to generate a result table of the JOIN operation, the filtering operation based on the indicator data.

30. The computer-storage medium of claim 21, the operations further comprising:

scheduling execution of the UNION operation on a first computing node of a plurality of computing nodes of a database system; and scheduling execution of one or more remaining operations of the modified query plan on at least a second computing node of the plurality of computing nodes.

* * * * *